United States Patent
Notoya et al.

(10) Patent No.: US 7,272,299 B2
(45) Date of Patent: Sep. 18, 2007

(54) DATA CONVERSION APPARATUS, DATA CODING APPARATUS, AND DATA RECORDING APPARATUS

(75) Inventors: Youji Notoya, Neyagawa (JP); Shinya Kadono, Nishinomiya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1413 days.

(21) Appl. No.: 10/005,329

(22) Filed: Dec. 7, 2001

(65) Prior Publication Data

US 2002/0071654 A1    Jun. 13, 2002

(30) Foreign Application Priority Data

Dec. 8, 2000    (JP) ............................. 2000-373893

(51) Int. Cl.
*H04N 5/91* (2006.01)

(52) U.S. Cl. .................. 386/95; 386/112; 386/129

(58) Field of Classification Search .................. 386/46, 386/68, 70, 95, 98, 109, 112, 125, 126, 129, 386/131
See application file for complete search history.

(56) References Cited

U.S. PATENT DOCUMENTS

| | | | |
|---|---|---|---|
| 5,239,418 A * | 8/1993 | Tyler et al. ................ | 386/81 |
| 6,453,117 B1 * | 9/2002 | Ito et al. .................... | 386/70 |
| 6,658,056 B1 * | 12/2003 | Duruoz et al. ............ | 375/240 |

* cited by examiner

*Primary Examiner*—Huy T. Nguyen
(74) *Attorney, Agent, or Firm*—Wenderoth, Lind & Ponack, L.L.P.

(57) ABSTRACT

A data conversion apparatus is provided with a temporary storage means for temporarily holding inputted variable-frame-rate coded data, a coded data time stamp reading means for reading a coded data time stamp of the inputted coded data, a time stamp conversion means for converting the coded data time stamp into an MP4 time stamp, and a fixed FPS means for converting the variable-frame-rate coded data into fixed-frame-rate coded data.

14 Claims, 17 Drawing Sheets

Fig.7 (a) ITS<=OTS
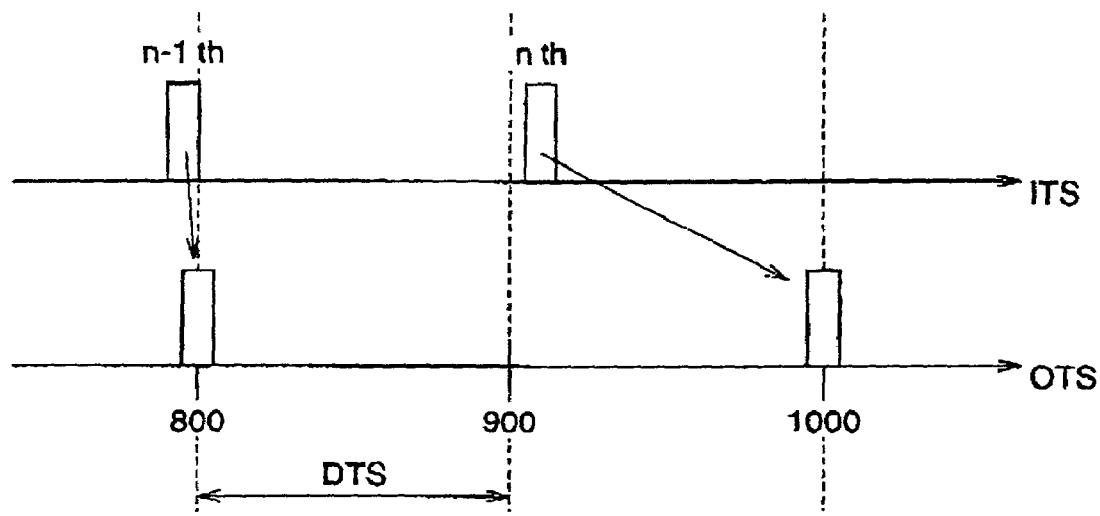
Fig.7 (b) ITS<=OTS+DTS/2
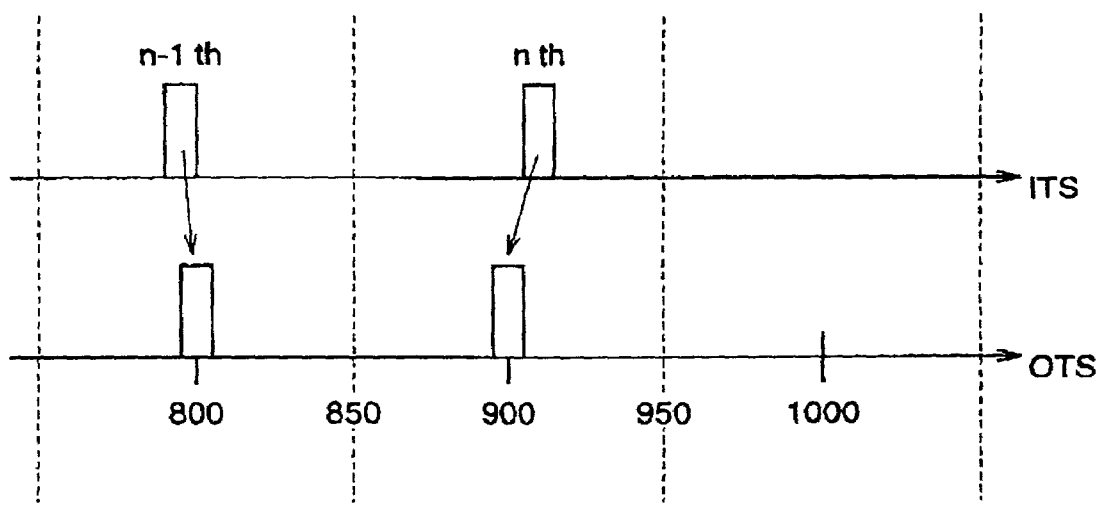

Fig.16 Prior Art
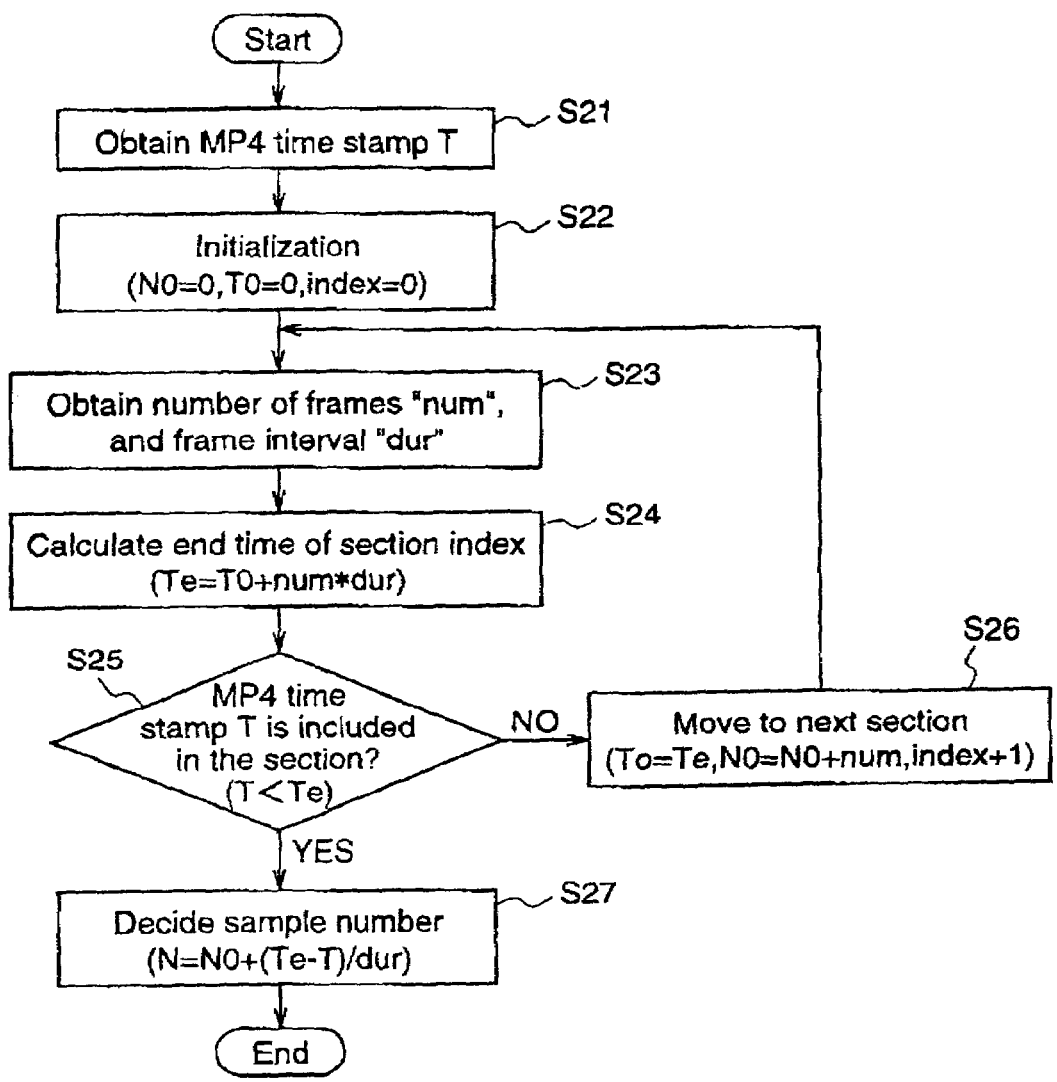
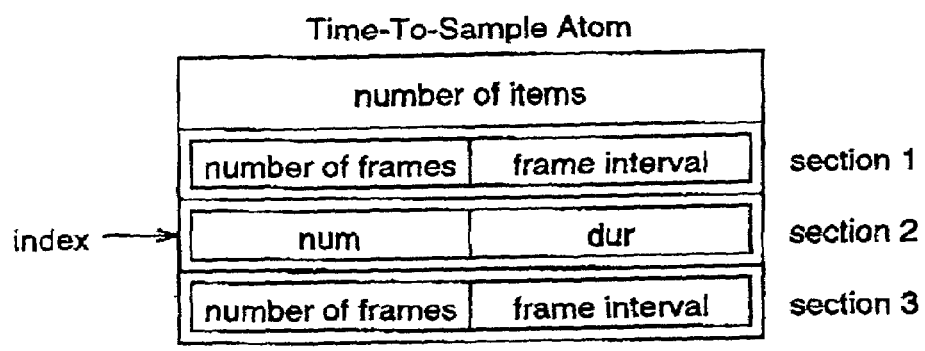

DATA CONVERSION APPARATUS, DATA CODING APPARATUS, AND DATA RECORDING APPARATUS

FIELD OF THE INVENTION

The present invention relates to a data conversion apparatus, a data coding apparatus, and a data recording apparatus, which convert coded data of a variable frame rate into coded data of a fixed frame rate.

BACKGROUND OF THE INVENTION

In recent years, distribution of images under low-bitrate environments, such as the Internet, mobile terminals, and the like, is becoming widespread. As image compression coding methods to be employed under these low-bitrate environments, there are H.263 standardized by ITU-T, MPEG-4 standardized by ISO/IEC, and the like.

MPEG-4 is able to perform coding at a variable frame rate (hereinafter referred to as "variable-frame-rate coding"), in contrast to MPEG-2 which has been adopted for DVD and become widespread. Variable-frame-rate coding is a coding scheme which permits setting of display time intervals of arbitrary frames, and this coding scheme is generally employed when optimum coding is carried out according to the complexity of a video signal in video signal compression, the property of the video signal (e.g., presence or absence of motion), and the like.

FIG. 10 shows an example of coded data at a variable frame rate. In FIG. 9, a video signal of 30 Hz is coded such that the first half is coded at 15 Hz by skipping every other frame while the second half is coded at 10 Hz by skipping two of every three frames.

Hereinafter, a coding process at a variable frame rate as shown in FIG. 10 will be described with reference to FIGS. 11 to 16.

Initially, the construction of a conventional data coding apparatus will be described with reference to FIG. 11.

FIG. 11 is a block diagram illustrating the construction of the conventional data coding apparatus.

In FIG. 11, the conventional data coding apparatus is provided with an image capture means 81 for capturing an image inputted from a camera; a coding judgement means 82 for judging whether a frame signal of the captured image is to be coded or not; a coding means 83 for coding the captured data; an MP4 file coding means 85 for converting the data coded by the coding means 83 into a file format standard based on MPEG-4 (hereinafter referred to as "MP4"); and a recording medium 86 on which the MP4 file is recorded.

Hereinafter, a description will be given of a sequential processing operation of the conventional data coding apparatus having the above-mentioned construction.

In the data coding apparatus, initially, the image capture means 81 converts an image supplied from the camera into an image frame signal (hereinafter, referred to as "frame"), and outputs the frame together with the frame number which increments at the frame rate of the camera (e.g., 30 Hz) from when the image capture is started, to the coding judgement means 82.

Then, the coding judgement means 82 calculates a time stamp of the inputted frame on the basis of the frame number and frame information of the camera, which has previously been given, and judges whether the inputted frame should be coded or not, on the basis of the time stamp, the total amount of data which have already been coded, and the output bit rate.

The criteria of judgement as to whether the inputted frame should be coded or not depend on various conditions of the data coding apparatus (e.g., whether the bit rate is variable or fixed, whether the buffer model defined in the standard should be respected or ignored, which is more important between the image quality of the inputted frame and the frame rate, etc.), and the applications of the data coding apparatus. However, specific criteria for judgement are not described here.

When the coding judgement means 82 judges that the inputted frame should be coded, the inputted frame and the time stamp thereof are outputted to the coding means 83, wherein coding of the frame is carried out. The time stamp of the frame is subjected to scale conversion or offset processing, and converted into an MP4 time stamp to be recorded in the MP4 file.

On the other hand, when the coding judgement means 82 judges that the inputted frame should not be coded, the frame and its time stamp are not outputted to the coding means 83 but are discarded, and the apparatus waits for a next frame to be inputted from the image capture means 81.

Generally, the above-mentioned data coding process by the coding means 83 takes much time. Further, depending on the characteristics of the image of the inputted frame, there may be cases where the coding process is not completed by the time a next frame captured by the image capture means 81 is outputted to the coding judgement means 82. In this case, the next captured frame is discarded in the coding judgement means 82. Since the discarded frame is not outputted to the coding means 83, the coded data corresponding to the frame is skipped.

Then, the coded data obtained by the coding means 83 and the amount of coded data are outputted to the MP4 file coding means 85. Further, the amount of coded data is also outputted to the coding judgement means 82. In the coding judgement means 82, the amount of coded data is used as a criterion for "bit rate fixed" or "buffer model respected", among the above-mentioned criteria for judgement as to whether the inputted frame should be coded or not.

In the MP4 file coding means 85, the coded data and the amount of coded data are converted into an MP4 file and recorded on the recording medium 86.

Hereinafter, the structure of the MP4 file will be described with reference to FIGS. 12(a) and 12(b).

FIG. 12(a) shows an example of coded data at a variable frame rate, and FIG. 12(b) shows the structure of an MP4 file corresponding to the variable-frame-rate coded data.

The MP4 file is composed of plural Atoms obtained by tabulating information of each frame inputted, such as "Sample Size Atom" where the sizes of coded data are stored, "Sample-To-TimeStamp Atom" where the display intervals are stored, "Movie Data Atom" where the coded data are stored, and the like.

First of all, in the Sample-To-TimeStamp Atom, a pair of number-of-frames "num" and frame interval "dur" are described for each section of a fixed frame rate, successively from the head of the coded data, and the number of sections is described before the table comprising the numbers-of-frames "num" and the frame intervals "dur". Further, in the Sample Size Atom, the sizes of the respective frames are described in the order of the frame numbers, and the number of items (i.e., the total number of frames) is described before the table comprising the frame sizes. In the Movie Data Atom, data of the respective samples are successively stored.

For example, it is assumed that the frames captured by the image capture means 81 are coded by the coding means 83 to be variable-frame-rate coded data having three different frame rates as shown in FIG. 12(*a*). In this case, as shown in FIG. 12(*b*), in the Sample Size Atom, the number-of-items "9", and the sizes of the coded data of the respective frames from the 1st sample to the 9th sample are described in the order of frame numbers. In the Movie Date Atom, the data of the samples from the 1st sample to the 9th sample are successively stored. In the Sample-To-TimeStamp Atom, number-of-items "3", number-of-frames "num=3" and frame interval "dur-2" for section 1, "num=2" and "dur=3" for section 2, and "num=4" and "dur=1" for section 3 are described since the interval of the first three frames of the above-mentioned coded data is "2", the interval of the next two frames is "3", and the interval of the next four frames is "1". Although, in the above description, one sample corresponds to one frame for simplification, the data storage method into each Atom is the same as described above even when 1024 samples correspond to one frame.

Next, a description will be given of the MP4 file coding means 85 which converts the coded data into the MP4 file as described above, with reference to FIGS. 13 and 14.

FIG. 13 is a block diagram illustrating an example of the construction of the conventional MP4 file coding means 85, and FIG. 14 is a flowchart illustrating a sequential processing operation of the conventional MP4 file coding means 85.

Initially, the construction of the MP4 file coding means 85 will be described with reference to FIG. 13.

The MP4 file coding means 85 receives coded data, the amount of coded data, and an MP4 time stamp to be used when the coded data is recorded as an MP4 file. The MP4 file coding means 85 is provided with a coded data temporary storage means 41 for temporarily holding the inputted coded data and the amount of coded data; a mdat atom formation means 43 for temporarily forms Movie Data Atom which is a data area where the coded data in the MP4 file is stored, on the mdat atom temporary storage means 46, by using the coded data supplied from the coded data temporary storage means 41; a stsz atom formation means 44 for forming Sample Size Atom which is a data area where the coded data amount in the MP4 file is recorded, on a stsz atom temporary storage means 47, by using the coded data amount supplied from the coded data temporary storage means 41; a stts atom formation means 45 for forming Sample-To-TimeStamp Atom which is a data area where the frame-to-frame time intervals in the MP4 file are recorded, on a stts atom temporary storage means 48, by using the MP4 time stamp supplied from the outside; and a temporary data coupling means 49 for coupling the respective Atoms which are separately formed on the respective temporary storage means 46~48 by the respective formation means 43~45, after inputting of the coded data to be recorded is completed. In the case where no MP4 time stamp is supplied from the outside to the MP4 file coding means 85, the MP4 file coding means 85 is provided with an MP4 time stamp reading means 42 which reads the time stamp of the coded data stored in the coded data temporary storage means 41, and subjects the time stamp to scale conversion or offset processing to covert it into an MP4 time stamp which is to be recorded in the MP4 file.

Although there are various methods of forming Movie Data Atom by the mdat atom formation means 43 according to the purposes, since the formation methods are insignificant in describing the present invention, specific descriptions thereof will be omitted. Furthermore, as for the Sample Size Atom formation method by the stsz atom formation means 44, the amounts of coded data are arranged from the beginning. The Sample-To-TimeStamp Atom formation method by the stts atom formation means 45 will be described later.

When inputting of all coded data to be recorded is completed, a stream end signal is inputted to the MP4 file coding means 84, whereby each of the atom formation means 43~45 performs processing for completing each Atom, such as writing of the number of table items. Thereafter, the respective Atoms are rearranged in appropriate positions by the temporary data coupling means 49, and the created MP4 file is outputted to the recording medium 86.

Hereinafter, a description will be given of the Sample-To-TimeStamp Atom formation method by the stts atom formation means 45 in the MP4 file coding means 85, with reference to a flowchart shown in FIG. 14.

When data processing is started in the data coding apparatus, the MP4 file coding means 85 performs initialization (step S1). In step S1, "in" indicates the total number of frames inputted to the MP4 coding means 85, "index" indicates the section number at a certain point of time in the Sample-To-TimeStamp Atom, "n" indicates the number of unprocessed frames, i.e., the number of frames which have not yet been entered in the Sample-To-TimeStamp Atom, among the frames inputted to the data coding apparatus, and "Tp" indicates the MP4 time stamp of just-previous coded data.

When the coded data, the amount of coded data, and the MP4 time stamp are inputted to the MP4 file coding means 85, the MP4 time stamp is set at "Ts", the number-of-input-frames "in" is incremented by 1, and the number-of-unprocessed-frame "n" is incremented by 1 (step S2).

Next, it is judged whether the number-of-input-frames "in" is in$\geq$3 or not. When in$\leq$2, the process goes to step S6. When in$\geq$3, the process goes to step S4. The reason of this bifurcation is as follows. Since the Sample-To-TimeStamp Atom describes the frame-to-frame time intervals, at least two frames are required. Further, since the Sample-To-TimeStamp Atom describes the number of frames having the same frame interval, writing of the first item cannot be performed unless there are at least three frames.

When in$\leq$2, the frame interval d is calculated, and the MP4 time stamp Ts of the currently inputted frame is recorded as the MP4 time stamp Tp of the just-previous frame (step S6). Thereafter, the processes in steps S2~S6 are repeated until a stream end signal indicating the end of coded data input is inputted to the stts atom formation means 45 (step S7).

In the above-mentioned repetition, when in$\geq$3 in step S3, it is judged whether or not the frame interval d (=Ts−Tp) between the current frame and the previous frame matches the frame interval d which has previously been calculated (step S4). When it is judged that there is no match, a table item is added to the Sample-To-TimeStamp Atom on the basis of the definition of the Sample-To-TimeStamp Atom (step S5). That is, number-of-frames num=n−2 and frame interval dur=d are added to the Sample-To-TimeStamp Atom. After the addition of the item to the Sample-To-TimeStamp Atom, the section number "index" is incremented by 1 and the number-of-unprocessed-frames "n" is Set to "n=2". These two frames are the first frame (just-previous MP4 time stamp Tp) and the second frame (current MP4 time stamp Ts) in the section having the latest frame interval d (=Ts−Tp).

When a stream end signal is inputted to the stts atom formation means 45 (step S7), the atts atom formation means 45 performs the processing for completing the Sample-To-TimeStamp Atom, such as writing of the number of table items.

That is, as already described with respect to step S5, at the point of time of step S7, the frame interval information relating to two frames is temporarily stored in the stts atom formation means 45, and it is not added to the table items of the Sample-To-TimeStamp Atom. Accordingly, when the stream end signal is inputted, processing for these two frames must be performed. When the number-of-input-frames "in" is smaller than 2, although it cannot happen usually, an operation different from the usual operation should be carried out.

Hereinafter, a description will be given of the case where the number-of-input-frames "in" is 0 or 1 when the stream end signal is inputted, which cannot happen usually.

When the number-of-input-frames "in" is 0 (in=0), i.e., when no frame is inputted, the process goes to step S9. In this case, of course there is no necessity of adding an item to the Sample-to-TimeStamp Atom. Then, the section number "index" is set at 0 (step S9), and the value, 0, is written in the Sample-To-TimeStamp Atom as the number of items (step S12).

When the number-of-input-frames "in" is 1 (in=1), number-of-frames "num=1" and frame interval "dur=du" (du: arbitrary number) are added and, further, the section number "index" is set at 1 (step S9), and thereafter, the value, 1, is written as the number of items in the Sample-To-TimeStamp Atom (step S12). Since the frame interval "dur" is not defined unless there are two frames, the frame interval "du" to be added as the frame interval "dur" in step S9 is not a significant value but an arbitrarily decided value.

When the number-of-input-frames "in" is equal to or larger than 2 (in≧2), which is the normal state, since n pieces of frames remain unprocessed, these frames are added to the Sample-To-TimeStamp Atom. That is, an item corresponding to number-of-frames "num=n" and frame interval "dur=d" is added to the Sample-To-TimeStamp Atom and, further, the section number "index" is incremented by 1 (step S11). Thereafter, the value of the "index" incremented by 1 is written as the number of items in the Sample-To-TimeStamp Atom (step S12), Thus, the Sample-To-TimeStamp Atom table formation process is completed.

Next, a description will be given of the case where MPEG-4 data are transmitted from a base station to a data recording apparatus according to RTP (Real-time Transport Protocol), with reference to FIG. 17.

FIG. 17 is a block diagram illustrating the construction of a conventional data recording apparatus as a mobile terminal, and MPEG-4 data from a transmitter are transmitted employing RTP.

Hereinafter, the conventional data recording apparatus will be described.

The data recording apparatus comprises an RTP receiver 91, an RTP reception buffer 92, an RTP decoder 93, an MP4 file encoder 95, and a recording medium 96. First of all, the RTP receiver 91 receives, from the RTP transmitter 90 as a base station, MPEG-4 coded data which are divided into units of video packets and stored in RTP packets, and the RTP receiver 91 stores the RTP packets into the reception buffer 92.

The above-mentioned video packets are units of data into which a frame is divided. Even when a video packet is lost or an error occurs in a video packet, other video packets can be normally decoded. Further, each RTP packet is given an RTP time stamp, and a value obtained by adding a random offset to a coded data time stamp possessed by coded data stored in the RTP packet is set. Usually, when one frame of coded data is divided into plural RTP packets, these RTP packets are given RTP time stamps of the same value. Further, these RTP packets are given sequence numbers, and the receiving end, i.e., the data recording apparatus, can confirm packet disappearance by checking the continuity of the sequence numbers.

The RTP decoder 93 receives at least one RTP packet having the same time stamp from the reception buffer 82, and restores the RTP packet to MPEG-4 data by removing an RTP header from the RTP packet. The MP4 file encoder 95 converts the MPEG-4 data from the RTP decoder 93 into an MP4 file, and stores it in the recording medium 96. Information required for conversion into the MP4 file, such as the MP4 time stamp, the frame size, and the like, can be obtained from the RTP time stamp added to the RTP packet and the size, in the RTP decoder 93.

When MPET-4 data are transmitted from the RTP transmitter 90 as a base station to the data recording apparatus as a mobile terminal by employing RTP, there may be cases where RTP packets from the RTP transmitter 90 do not reach the data recording apparatus. For example, when plural RTP packets, into which frames are divided, are transmitted from the RTP transmitter 90, if some of the RTP packets are lost or all RTP packets constituting a frame are lost, the data recording apparatus skips the data which cannot be normally received by the RTP receiver 91, and records only the data which are normally received by the RTP receiver 91, as an MP4 file on the recording medium 96.

The variable-frame-rate coding described above has the advantage over the fixed-frame-rate coding in that coding can be carried out according to the compression ratio of an image signal. On the other hand, since the variable-frame-rate coding has a degree of freedom in the frame rate, when variable-frame-rate coded data are converted into the MP4 file, the table size of the Sample-To-TimeStamp Atom in the MP4 file, where the frame intervals are recorded, depends on the coded data. Therefore, the table size cannot be assumed, and data restoration becomes difficult when an abnormal condition occurs in the apparatus. Further, the volume of data processing required when the coded data recorded as an MP4 file are decoded from the MP4 file, is increased.

To be specific, in the conventional data coding apparatus shown in FIG. 11, when the MP4 file coding means 85 converts the variable-frame-rate coded data into the MP4 file, a new item must be stored in the Sample-To-TimeStamp Atom, every time the frame interval of the coded data changes, according to the result of judgement by the coding judgement means 82. Thereby, in the MP4 file, the table size of the Sample-To-TimeStamp Atom increases as well as the Sample Size Atom and the Movie Data Atom and, therefore, more capacity of the recording medium 86 is required as compared with the case where fixed-frame-rate coded data are recorded as an MP4 file. The increase in the table size of the Sample-To-TimeStamp Atom is evident from the comparison between the MP4 file structure in the case where the fixed-frame-rate coded data are converted into the MP4 file (FIG. 15) and the MP4 file structure of the variable-frame-rate coded data (FIG. 12). That is, when the coded data are based on the fixed frame rate as shown in FIG. 15, as the frame interval is always dur=1, the number of items on the table of the Sample-to-TimeStamp Atom is one, and the table size does not change.

Further, in the above-described Sample-To-TimeStamp Atom formation method, when the variable-frame-rate coded data are converted into the MP4 file, the table of the Sample-To-TimeStamp Atom is increased according to the result of judgement by the coding judgement means 82 for every input frame, in contrast to the Sample Size Atom or Movie Data Atom formation method. Therefore, it is impossible to estimate the final table size when recording of the MP4 file of the coded data is started.

Furthermore, in the conventional data coding apparatus, when the variable-frame-rate coded data are converted into the MP4 file by the MP4 file coding means 85, the Sample Size Atom and the Movie Data Atom are formed while writing the data successively in the stsz atom temporary storage means 47 and the mdat atom temporary storage means 46 for each unit of coded data (one frame). Therefore, even when an abnormal condition occurs in the data coding apparatus, data restoration is possible. However, when the Sample-To-TimeStamp Atom is formed, since the item of the table is determined at the time when the frame rate changes, the data on the table of the Sample-To-TimeStamp Atom cannot be restored completely if an abnormal condition occurs in the data coding apparatus.

Furthermore, as the table size of the Sample-To-TimeStamp Atom in the MP4 file is increased, the volume of processing required when reproducing the data recorded on the recording medium 86 is increased, as described below.

First of all, the Sample-To-TimeStamp Atom is interpreted, and the sample number is calculated from the MP4 time stamp or the MP4 time stamp is calculated from the sample number.

Hereinafter, a description will be given of the process of obtaining a sample number N corresponding to a given MP4 time stamp (T) from the Sample-To-TimeStamp Atom, with reference to FIG. 16.

FIG. 16 is a flowchart illustrating a sequential flow of the process of searching for a sample corresponding to a given MP4 time stamp by using the Sample-To-TimeStamp Atom.

Initially, an MP4 time stamp T is set (step S21), and the section number "index", the MP4 time stamp "T0" of the first frame in the section indicated by the section number "index", and the number-of-frames "N0" included in the section indicated by the section number "index" are initialized (step S22). Then, the number-of-frames "num" and the frame interval "dur", which are included in the section indicated by the current index, are extracted from the Sample-To-TimeStamp Atom (step S23), and furthermore, an end time Te of the section indicated by the current index is calculated (step S24). The end time Te of the section indicated by the current index is obtained by T0+num*dur.

Then, the end time Te of the section indicated by the current index is compared with the MP4 time stamp T to judge whether the MP4 time stamp is included in the section or not (step S25).

When T<Te in step S25, it is judged that the MP4 time stamp is included in the section indicated by the current "index", and the sample number of the MP4 time stamp is decided (step 327). The sample number is decided as follows. Since the time up to the section indicated by the current "index" is the MP4 time stamp T0 of the first frame in the section indicated by the section number "index", the time up to the frame indicated by the MP4 time stamp T is T−T0. Further, since the frame interval of this section is "dur", the frame of the sample indicated by the MP4 time stamp T is the {(T−T0)/dur}-th frame from the beginning of this section. Accordingly, the sample number N of the frame is N0+(T−T0)/dur.

On the other hand, when T>Te in step S25, it is judged that the MP4 time stamp T is not included in the section indicated by the current "index", and the next item on the table of the Sample-To-TimeStamp Atom takes place (step S26). That is, the end time Te of the section obtained in step S24 is set as the start time T0 of the next section, and the sum of the number-of-items "N0" up to this section and the number-of-frames "num" of this section is set as the number-of-items "N0" until the next section, did the section number "index" is incremented by 1. Thereafter, the process returns to step S23, and the above-mentioned processes are repeated until it is judged that T<Te in step S25. When "index" becomes equal to or larger than the number of items in step S26, it means that the frame indicated by the MP4 time stamp has not been detected.

As described above, when the number of items on the table of the Sample-To-TimeStamp Atom increases, the processes in steps S23 to S26 must be repeated until a section including the MP4 time stamp T is detected, whereby the time and effort for detecting the sample number N of the frame indicated by the MP4 time stamp T are significantly increased. Further, also in the process of obtaining the MP4 time stamp T from the sample number N, which is the inverse of the above-mentioned process, the volume of processing increases in proportion to the number of items on the Sample-To-TimeStamp Atom.

Furthermore, since packet retransmission is not performed in the data transmission using RTP shown in FIG. 17, packet delays are not accumulated and, therefore, this data transmission is suitable for real-time transmission. However, if a delay or temporary cut-off occurs in the network, some packets might be lost before reaching the data recording apparatus at the receiving end. In view of such property of RTP, in the data recording apparatus which records, as an MP4 file, the MPEG-4 data received from the RTP transmitter 90 at the base station by using RTP, there is a great possibility that the transmitted coded data may be lost. When the transmitted data are lost, the frame rate of the received coded data changes frequently, resulting in a considerable increase in the number of table items of the Sample-To-TimeStamp Atom which holds the frame-to-frame display intervals.

Furthermore, assuming that the above-described data coding apparatus or data recording medium is mounted on a mobile terminal which is significantly restricted by its physical size or power consumption or the capacity of the recording medium, the above-described problems, i.e., the increase in the data size of the Sample-To-TimeStamp Atom, the difficulty in completely restoring the data of the Sample-To-TimeStamp Atom, and the considerable volume of processing when reproducing the data, will lead to various problems.

SUMMARY OF THE INVENTION

The present invention is made to solve the above-described problems and has for its object to provide a data conversion apparatus, a data coding apparatus, and a data recording apparatus, which are able to convert a variable frame rate to a fixed frame rate when variable-frame-rate coded MPEG-4 data are converted into an MP4 file to be recorded.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data conversion apparatus comprising a temporary storage means for temporarily holding coded data of inputted video signal data; a time stamp reading means for reading an input time stamp which is time information of the coded data, from the coded data stored in the temporary storage means; a time stamp conversion means for converting the input time stamp of the coded data into a time stamp based on a fixed frame rate to be employed when outputting the coded data, said fixed frame rate being inputted from the outside as initial information; and a fixed frame rate conversion means for converting the coded data to which the time stamp based on the fixed frame rate is added, into coded data at the fixed frame rate. Therefore, the data conversion apparatus can convert coded data which are inputted at a variable frame rate into coded data of a fixed frame rate. As the result, when the coded data are recorded in a standard file format, the process of seeking the coded data is facilitated, whereby the expediency of the coded data is improved.

According to a second aspect of the present invention, in the data conversion apparatus according to the first aspect, the fixed frame rate conversion means comprises a non-updation frame formation means for forming coded data having information indicating non-updation, and adding an arbitrary value as the input time stamp to the coded data which means non-updation; and a processing means for determining an output time stamp of the coded data outputted from the fixed frame rate conversion means, comparing the output time stamp with the time stamp based on the fixed frame rate, and performing control for selecting one of the temporary storage means and the non-updation frame formation means, on the basis of the result of the comparison; and the processing means performs a control so as to output the output time stamp and the coded data stored in the temporary storage means, when the output time stamp is equal to or larger than the time stamp based on the fixed frame rate, and performs a control so as to output the output time stamp, and the coded data which means non-updation and is outputted from the non-updation frame formation means, when the output time stamp is smaller than the time stamp based on the fixed frame rate. Therefore, the data conversion apparatus can convert coded data which are inputted at a variable frame rate into fixed-frame-rate coded data which are transportable between the data conversion apparatus and an external apparatus.

According to a third aspect of the present invention, in the data conversion apparatus according to the first aspect, the fixed frame rate conversion means comprises a size 0 frame formation means for forming coded data which means that its size is 0, and adding an arbitrary value as the input time stamp to the coded data which means that its size is 0; and a processing means for determining an output time stamp of the coded data outputted from the fixed frame rate conversion means, comparing the output time stamp with the time stamp based on the fixed frame rate, and performing control for selecting one of the temporary storage means and the size 0 frame formation means, on the basis of the result of the comparison; and the processing means performs a control so as to output the output time stamp, and the coded data stored in the temporary storage means, when the output time stamp is equal to or larger than the time stamp based on the fixed frame rate, and performs a control so as to output the output time stamp, and the coded data which means that its size is 0 and is outputted from the size 0 frame formation means, when the output time stamp is smaller than the time stamp based on the fixed frame rate. Therefore, the data conversion apparatus can convert coded data which are inputted at a variable frame rate into coded data of a fixed frame rate. Further, when the coded data are recorded in a standard file format on a recording medium or the like, the capacity required for the recording can be reduced.

According to a fourth aspect of the present invention, in the data conversion apparatus according to the second aspect, the processing means performs a control so as to output the output time stamp and the coded data stored in the temporary storage means, when a value obtained by adding an arbitrary value to the output time stamp is equal to or larger than the time stamp based on the fixed frame rate, and performs a control so as to output the output time stamp, and the coded data which means non-updation and is outputted from the non-updation frame formation means, when the value obtained by adding the arbitrary value to the output time stamp is smaller than the time stamp based on the fixed frame rate. Therefore, fluctuations of the time stamps added to the inputted video data are resolved in the processing means.

According to a fifth aspect of the present invention, in the data conversion apparatus according to the third aspect, the processing means performs a control so as to output the output time stamp, and the coded data stored in the temporary storage means, when a value obtained by adding an arbitrary value to the output time stamp is equal to or larger than the time stamp based on the fixed frame rate, and performs a control so as to output the output time stamp, and the coded data which means that its size is 0 and is outputted from the size 0 frame formation means, when the value obtained by adding the arbitrary value to the output time stamp is smaller than the time stamp based on the fixed frame rate. Therefore, fluctuations of the time stamps which are added to the inputted video data are resolved in the processing means.

According to a sixth aspect of the present invention, in the data conversion apparatus according to the second aspect, the fixed frame rate conversion means further includes a coded data time stamp continuation means for rewriting the input time stamp of the coded data outputted from the temporary storage means, and the input time stamp of the coded data which means non-updation and is outputted from the non-updation frame formation means, so as to make these input time stamps continuous, on the basis of the output time stamp. Therefore, errors in the input time stamps added to the coded data can be compensated to generate coded data having continuous input time stamps. As the result, a file or the like comprising only the coded data can be formed from the data outputted from the fixed frame rate conversion means.

According to a seventh aspect of the present invention, in the data conversion apparatus according to the third aspect, the fixed frame rate conversion means further includes a coded data time stamp continuation means for rewriting the input time stamp of the coded data outputted from the temporary storage means, and the input time stamp of the coded data which means that its size is 0 and is outputted from the size 0 frame formation means, so as to make these input time stamps continuous, on the basis of the output time stamp. Therefore, errors in the input time stamps added to the coded data can be compensated to generate coded data having continuous input time stamps. As the result, a file or the like comprising only the coded data can be formed from the data outputted from the fixed frame rate conversion means.

According to an eighth aspect of the present invention, there is provided a data coding apparatus which captures inputted video signal data, judges whether the video signal data is to be coded or not on the basis of an input time stamp which is time information of the video signal data, and compressively encodes the video signal data by a coding means to obtain coded data at a variable frame rate, on the basis of the result of the judgement; which apparatus includes a non-updation frame formation means for forming coded data having information which means non-updation, adding an arbitrary value as the input time stamp to the coded data which means non-updation, and determining a time stamp based on a fixed frame rate at the time of output; wherein, when the result of the judgement is that the video signal data is not to be encoded, the coded data meaning non-updation and the time stamp based on the fixed frame rate are outputted from the non-updation frame formation means. Therefor, video signal data, which have conventionally been skipped without being coded because of a delay in the processing by the coding means or the like and compressively coded as coded data of a variable frame rate, can be compressively coded to be fixed-frame-rate coded data which are transportable between the data coding apparatus and an external apparatus. As the result, when the coded data is recorded in a standard file format, the process of seeking the coded data is facilitated, whereby the expediency of the coded data is improved.

According to a ninth aspect of the present invention, there is provided a data coding apparatus which captures inputted video signal data, judges whether the video signal data is to be coded or not on the basis of an input time stamp which is time information of the video signal data, and compressively encodes the video signal data by a coding means to obtain coded data at a variable frame rate, on the basis of the result of the judgement; which apparatus includes a size 0 frame formation means for forming coded data which means that its size is 0, adding an arbitrary value as the input time stamp to the coded data which means that its size is 0, and determining a time stamp based on a fixed frame rate at the time of output; wherein, when the result of the judgement is that the video signal data is not to be encoded, the coded data meaning that the size is 0 and the time stamp based on the fixed frame rate are outputted from the size 0 frame formation means. Therefore, video signal data, which have conventionally been skipped without being coded because of a delay in the processing by the coding means or the like and compressively coded as coded data of a variable frame rate, can be compressively coded as coded data of a fixed frame rate. As the result, when the coded data is recorded in a standard file format, the process of seeking the coded data is facilitated, whereby the expediency of the coded data can be improved. Further, when the coded data is recorded in the standard file format on the recording medium, the capacity required for the recording can be reduced.

According to a tenth aspect of the present invention, there is provided a data recording apparatus comprising an RTP reception means for receiving transmitted RTP packets, an RTP reception buffer for temporarily holding the received RTP packets, and an RTP decoding means for restoring the RTP packets, which are stored in the RTP reception buffer and have the same RTP time stamp, to coded data; converting the coded data into a standard file format; and recording the file on a recording medium; which apparatus further comprises a time stamp conversion means for obtaining the RTP time stamp from the RTP reception buffer, and converting the RTP time stamp into a time stamp based on a fixed frame rate to be employed when outputting the coded data, said fixed frame rate being supplied from the outside as initial information, and a fixed frame rate conversion means for converting the coded data to which the time stamp based on the fixed frame rate is added, into coded data of the fixed frame rate; wherein the coded data of the fixed frame rate, which is outputted from the fixed frame rate conversion means, is converted into a standard file format to be recorded on the recording medium. Therefore, when coded data transmitted by RTP packets are converted into a standard file format to be recorded, coded data of a variable frame rate, which might be skipped because of disappearance of the corresponding RTP packets during transmission, can be converted into coded data of a fixed frame rate, and thereafter, the fixed-frame-rate coded data can be recorded as a standard file format. As the result, the process of seeking the coded data is facilitated, whereby the expediency of the coded data is improved.

According to an eleventh aspect of the present invention, in the data recording apparatus according to the tenth aspect, the fixed frame rate conversion means comprises a non-updation frame formation means for forming coded data having information which means non-updation, and adding an arbitrary value as the input time stamp to the coded data which means non-updation; a temporary storage means for temporarily holding the coded data from the RTP decoding means; and a processing means for determining an output time stamp of the coded data outputted from the fixed frame rate conversion means, comparing the output time stamp with the time stamp based on the fixed frame rate, and performing control for selecting one of the temporary storage means and the non-updation frame formation means on the basis of the result of the comparison; and the processing means performs a control so as to output the output time stamp and the coded data stored in the temporary storage means, when the output time stamp is equal to or larger than the time stamp based on the fixed frame rate, and performs a control so as to output the output time stamp, and the coded data which means non-updation and is outputted from the non-updation frame formation means, when the output time stamp is smaller than the time stamp based on the fixed frame rate. Therefore, the data recording apparatus can covert coded data which are inputted at a variable frame rate into fixed-frame-rate coded data which are transportable between the data recording apparatus and an external apparatus.

According to a twelfth aspect of the present invention, in the data recording apparatus according to the tenth aspect, the fixed frame rate conversion means comprises a size 0 frame formation means for forming coded data which means that its size is 0, and adding an arbitrary value as the input time stamp to the coded data which means that its size is 0; a temporary storage means for temporarily holding the coded data from the RTP decoding means; and a processing means for determining an output time stamp of the coded data outputted from the fixed frame rate conversion means, comparing the output time stamp with the time stamp based on the fixed frame rate, and performing control for selecting one of the temporary storage means and the size 0 frame formation means on the basis of the result of the comparison; and the processing means performs a control so that the output time stamp and the coded data stored in the temporary storage means are outputted when the output time stamp is equal to or larger than the time stamp based on the fixed frame rate, and performs a control so that the output time stamp and the coded data which means that its size is 0 and is outputted from the size 0 frame formation means are outputted when the output time stamp is smaller than the time stamp based on the fixed frame rate. Therefore, the data recording apparatus can convert coded data of a variable frame rate into coded data of a fixed frame rate. Further, when the coded data are recorded in a standard file format on the recording medium, the capacity required for the recording can be reduced.

According to a thirteenth aspect of the present invention, in the data recording apparatus according to the eleventh aspect, the processing means performs a control so as to output the output time stamp and the coded data stored in the temporary storage means, when a value obtained by adding an arbitrary value to the output time stamp is equal to or larger than the time stamp based on the fixed frame rate, and performs a control so as to output the output time stamp, and the coded data which means non-updation and is outputted from the non-updation frame formation means, when the value obtained by adding the arbitrary value to the output time stamp is smaller than the time stamp based on the fixed frame rate. Therefore, fluctuations of the time stamps added to the transmitted RTP packets can be resolved in the processing means.

According to a fourteenth aspect of the present invention, in the data recording apparatus according to the twelfth aspect, the processing means performs a control so as to output the output time stamp, and the coded data stored in the temporary storage means, when a value obtained by adding an arbitrary value to the output time stamp is equal to or larger than the time stamp based on the fixed frame rate, and performs a control so as to output the output time stamp, and the coded data which means that its size is 0 and is outputted from the size 0 frame formation means, when the value obtained by adding the arbitrary value to the output time stamp is smaller than the time stamp based on the fixed frame rate. Therefore, fluctuations of the time stamps added to the transmitted RTP packets can be resolved in the processing means.

According to a fifteenth aspect of the present invention, in the data recording apparatus according to the eleventh aspect, the fixed frame rate conversion means further includes a coded data time stamp continuation means for rewriting the input time stamp of the coded data outputted from the temporary storage means, and the input time stamp of the coded data which means non-updation and is outputted from the non-updation frame formation means, so as to make these input time stamps continuous, on the basis of the output time stamp. Therefore, errors in the input time stamps added to the coded data can be compensated to generate coded data having continuous input time stamps. As the result, a file or the like comprising only the coded data can be formed from the data converted into the standard file format and recorded on the recording medium.

According to a sixteenth aspect of the present invention, in the data recording apparatus according to the twelfth aspect, the fixed frame rate conversion means further includes a coded data time stamp continuation means for rewriting the input time stamp of the coded data outputted from the temporary storage means, and the input time stamp of the coded data which means that its size is 0 and is outputted from the size 0 frame formation means, so as to make these input time stamps continuous, on the basis of the output time stamp. Therefore, errors in the input time stamps added to the coded data can be compensated to generate coded data having continuous input time stamps. As the result, a file or the like comprising only the coded data can be formed from the data converted into the standard file format and recorded on the recording medium.

BRIEF DESCRIPTION OF THE DRAWINGS

FIGS. 7(a) and 7(b) are diagrams for explaining fluctuations of an MP4 time stamp ITS of an input frame according to the first embodiment.

FIG. 16 is a flowchart for explaining a sequential flow of processes of searching for a sample corresponding to a given MP4 time stamp, employing Sample-To-TimeStamp Atom, according to the prior art.

DETAILED DESCRIPTION OF THE PREFERRED EMBODIMENTS

Hereinafter, preferred embodiments of the present invention will be described. The present invention relates to recording of input data at a fixed frame rate when the input data is recorded in an MP4 file. In the present invention, first, second, and third embodiments will be described with respect to the cases where the input data is variable-frame-rate coded MPEG-4 video data, uncoded video data, and RTP data received by transmission protocol RTP, respectively.

Embodiment 1

Hereinafter, a data conversion apparatus according to the first embodiment of the present invention will be described with reference to FIGS. 1 through 6.

A data conversion apparatus 100 according to the first embodiment converts variable-frame-rate coded MPEG-4 video data into fixed-frame-rate coded data.

Initially, the construction of the data conversion apparatus 100 according to the first embodiment will be described with reference to FIG. 1.

Figure 1:
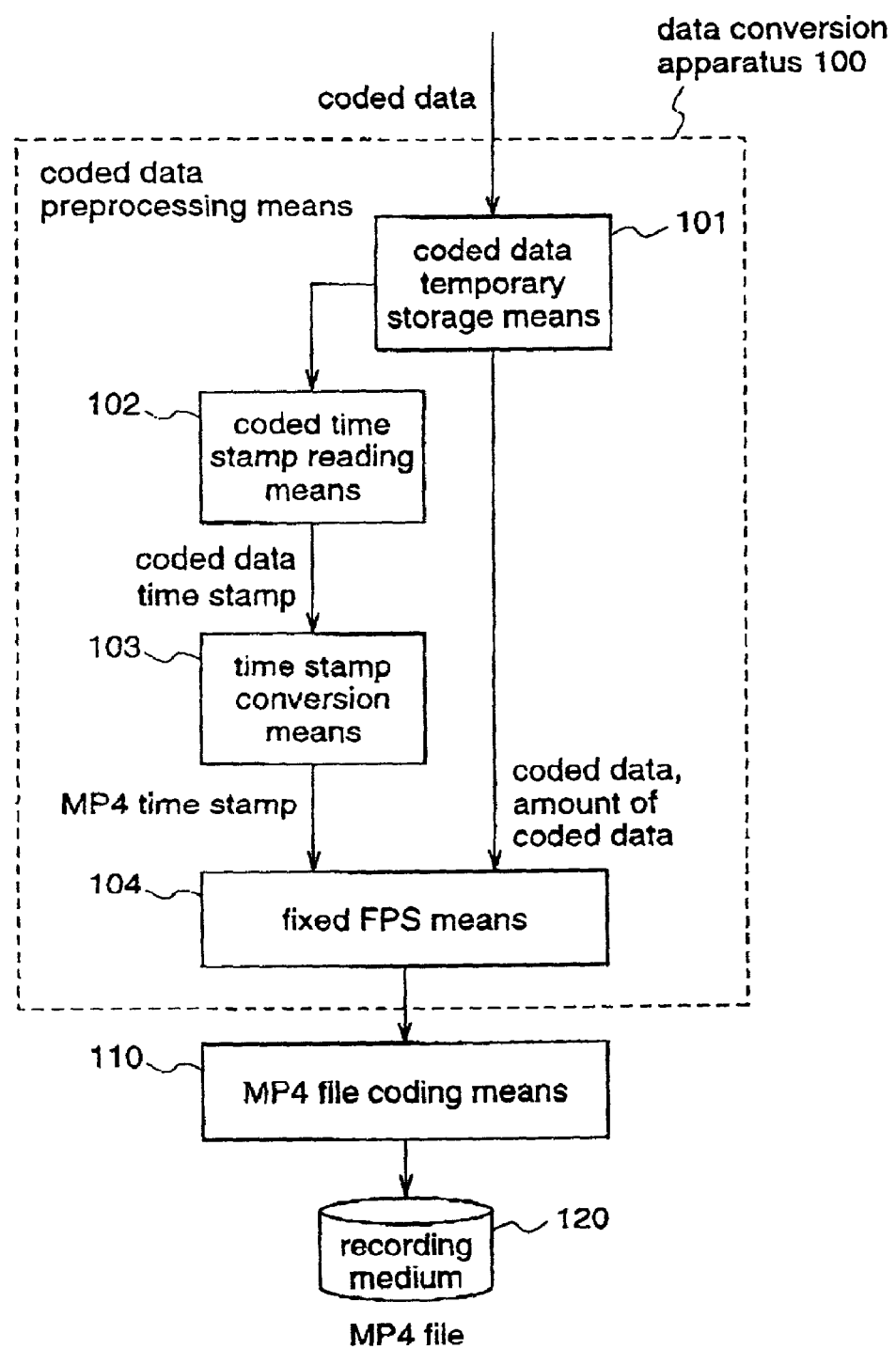
FIG. 1 is a block diagram illustrating the construction of a data conversion apparatus according to a first embodiment of the present invention.

FIG. 1 is a block diagram illustrating the construction of the data conversion apparatus 100 according to the first embodiment.

With reference to FIG. 1, the data conversion apparatus 100 comprises a coded data temporary storage means 101, a coded data time stamp reading means 102, a time stamp conversion means 103, and a fixed FPS means 104.

The coded data temporary storage means 101 temporarily holds coded data inputted to the data conversion apparatus 100, and the coded data time stamp reading means 102 acquires a coded data time stamp from the coded data stored in the coded data temporary storage means 101.

The acquisition of the coded data time stamp form the coded data is carried out as follows.

Initially, a scale (vop-time-increment-resolution) of the coded data time stamp is obtained from a VOL header attached before the first coded data or from VOL headers attached before coded data at intervals of several frames, and furthermore, an increment (modulo-time-base, vop-time-increment) of the coded data time stamp is obtained from a VOP header of each coded data, followed by appropriate calculation.

Further, the time stamp conversion means 103 converts the coded data time stamp which is read by the coded data time stamp reading means 102 into an MP4 time stamp in an expression form common to the respective embodiments of the present invention. The MP4 time stamp in an expression form common to the embodiments of the invention is a time stamp is a time stamp to be recorded in the Sample-To-TimeStamp Atom of the MP4 file in a form starting from 0.

Further, the fixed FPS means 104 converts variable-frame-rate coded data into fixed-frame-rate coded data.

Figure 2:
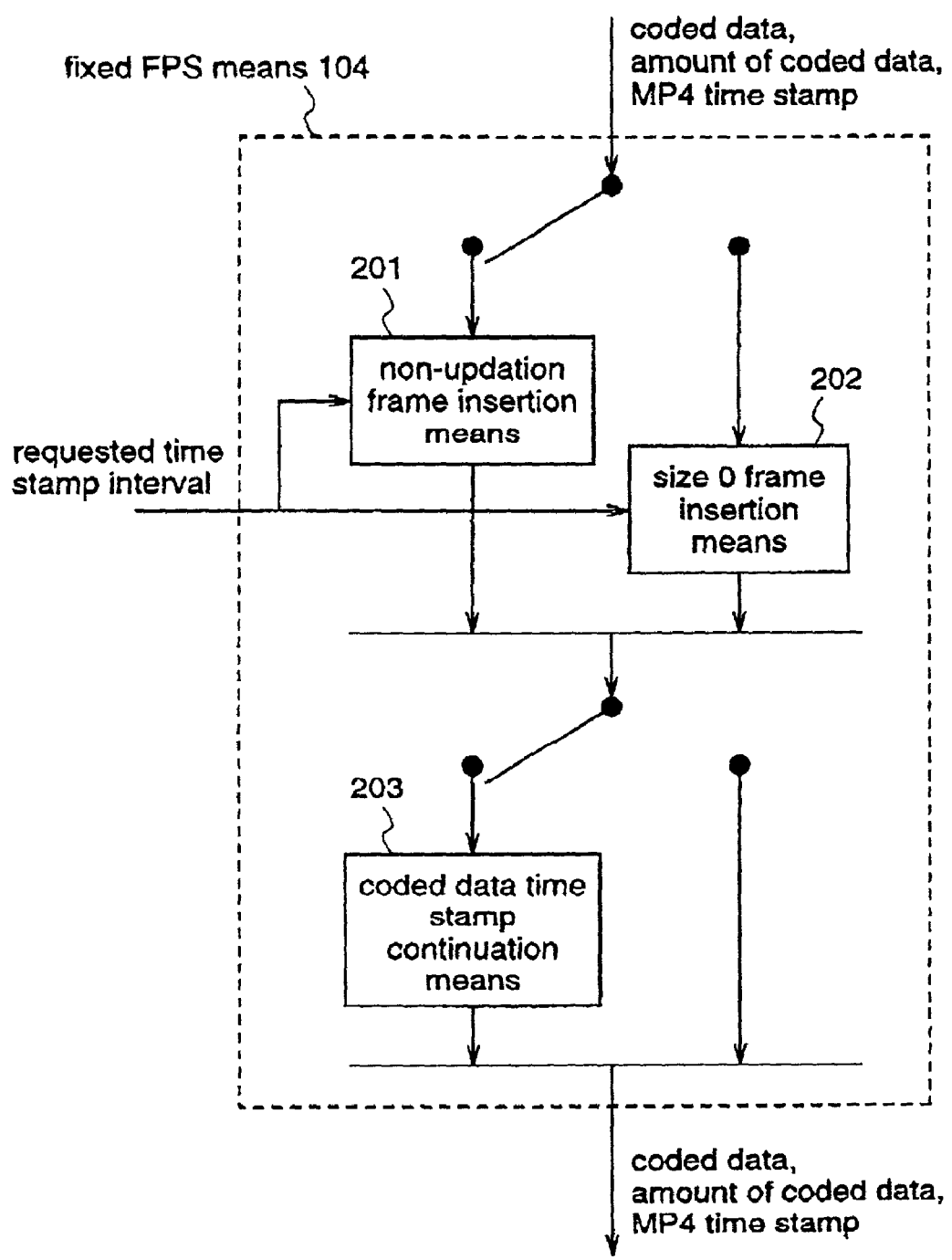
FIG. 2 is a block diagram illustrating the construction of a fixed FPS means included in the data conversion apparatus according to the first embodiment.

Hereinafter, the construction of the fixed FPS means 104 will be described in detail with reference to FIGS. 2 and 3(a)-3(c). FIG. 2 is a block diagram illustrating the construction of the fixed FPS means 104, and FIGS. 3(a), 3(b), and 3(c) are block diagrams illustrating a non-updation frame insertion means, a size 0 frame insertion means, and a coded data time stamp continuation means, respectively.

Figure 12:
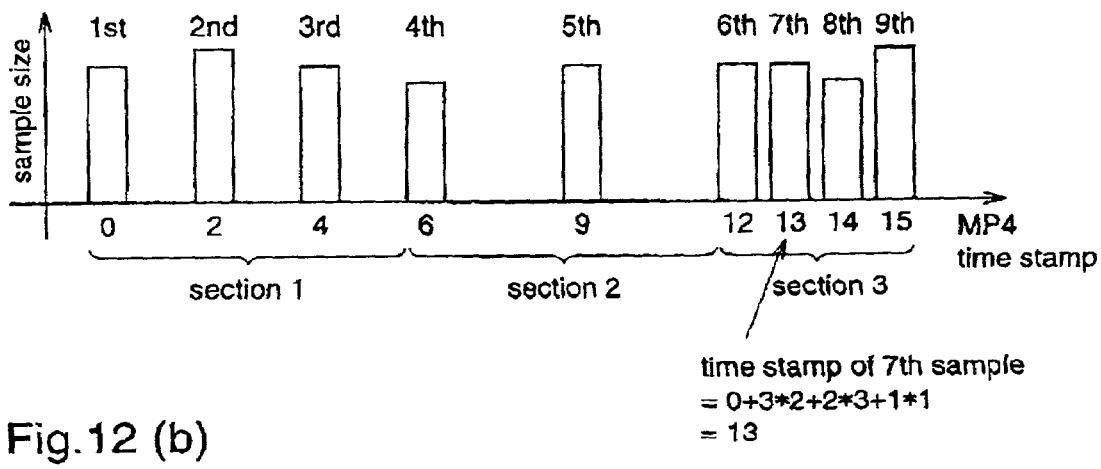
FIGS. 12(a) and 12(b) are diagrams illustrating variable-frame-rate coded data (12(a)) and the construction of an MP4 file (12(b)), which are formed by a conventional MP4 file coding means.
Figure 12:
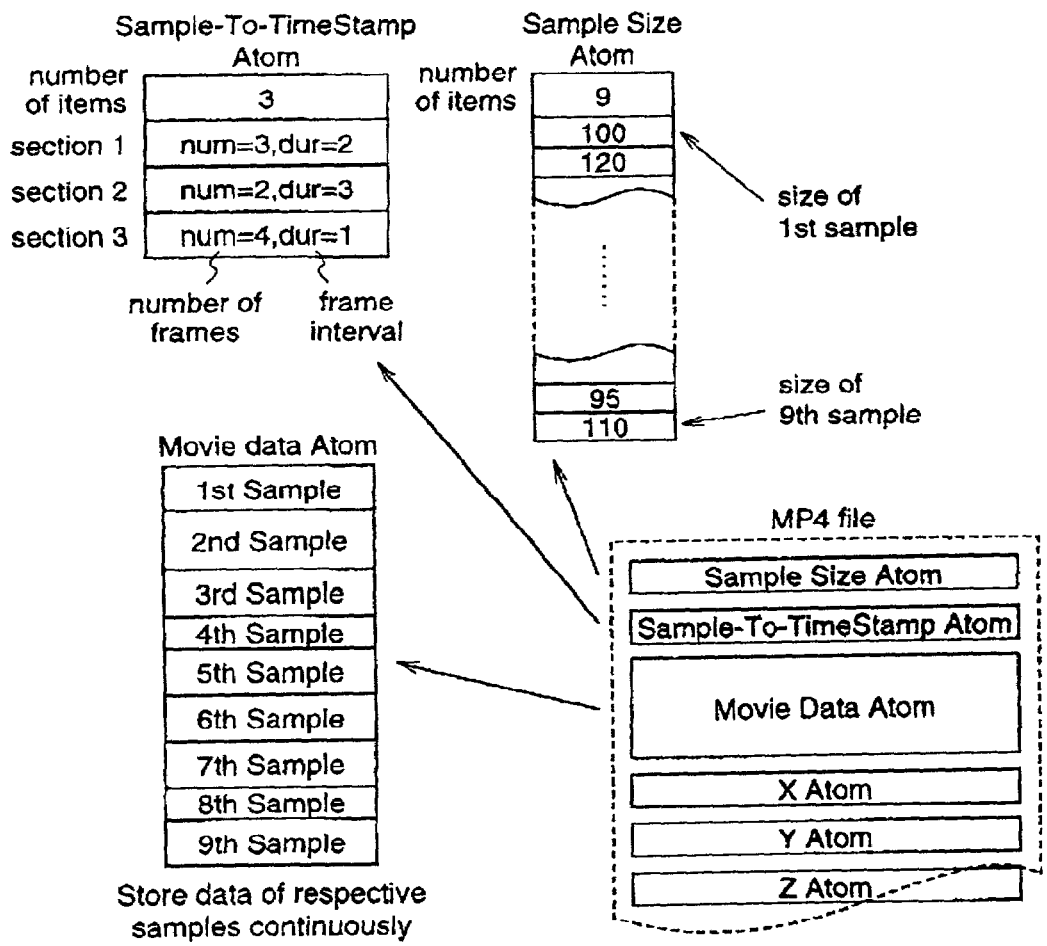
Figure 13:
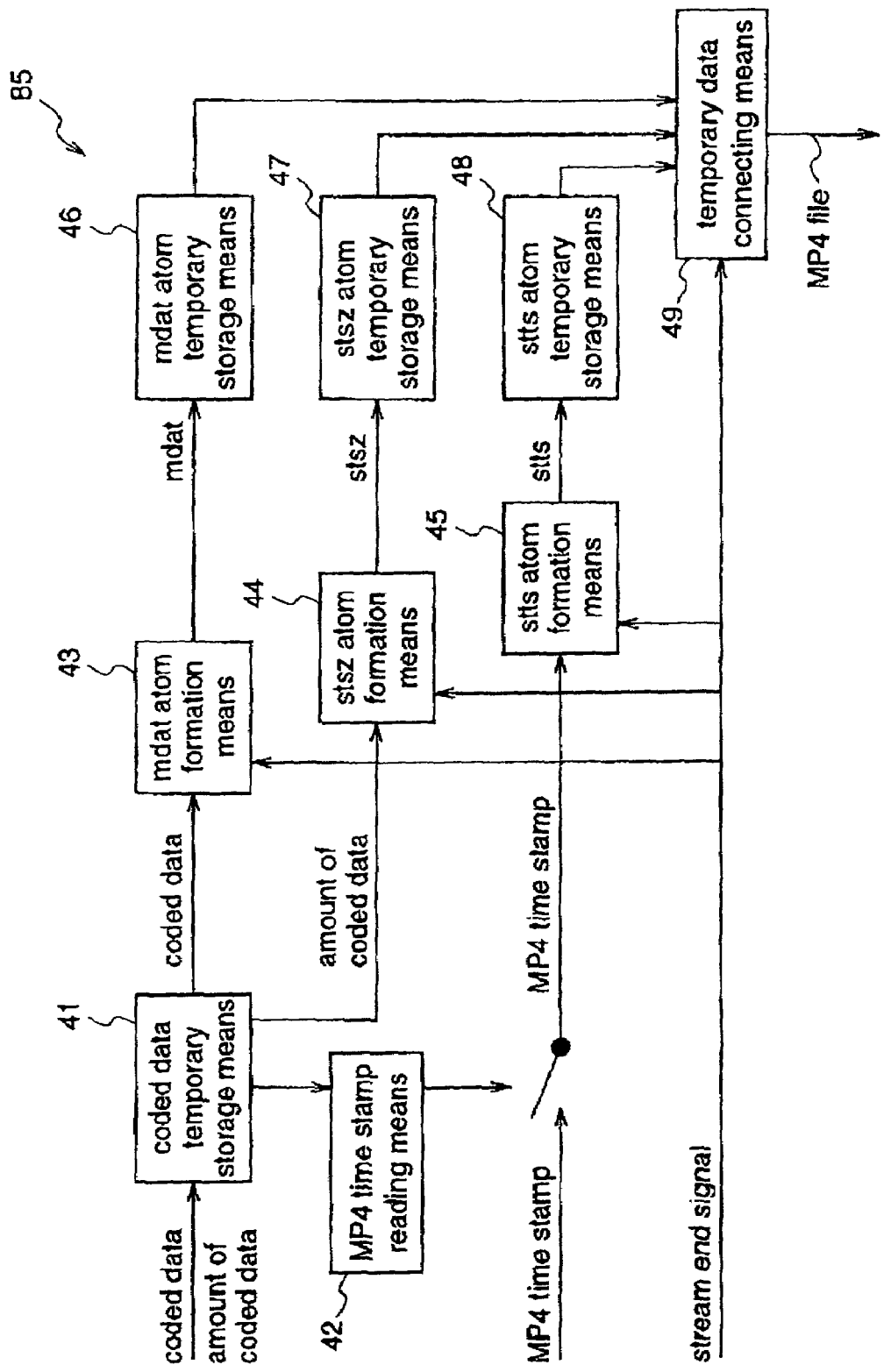
FIG. 13 is a block diagram illustrating the construction of the conventional MP4 file coding means.
Figure 14:
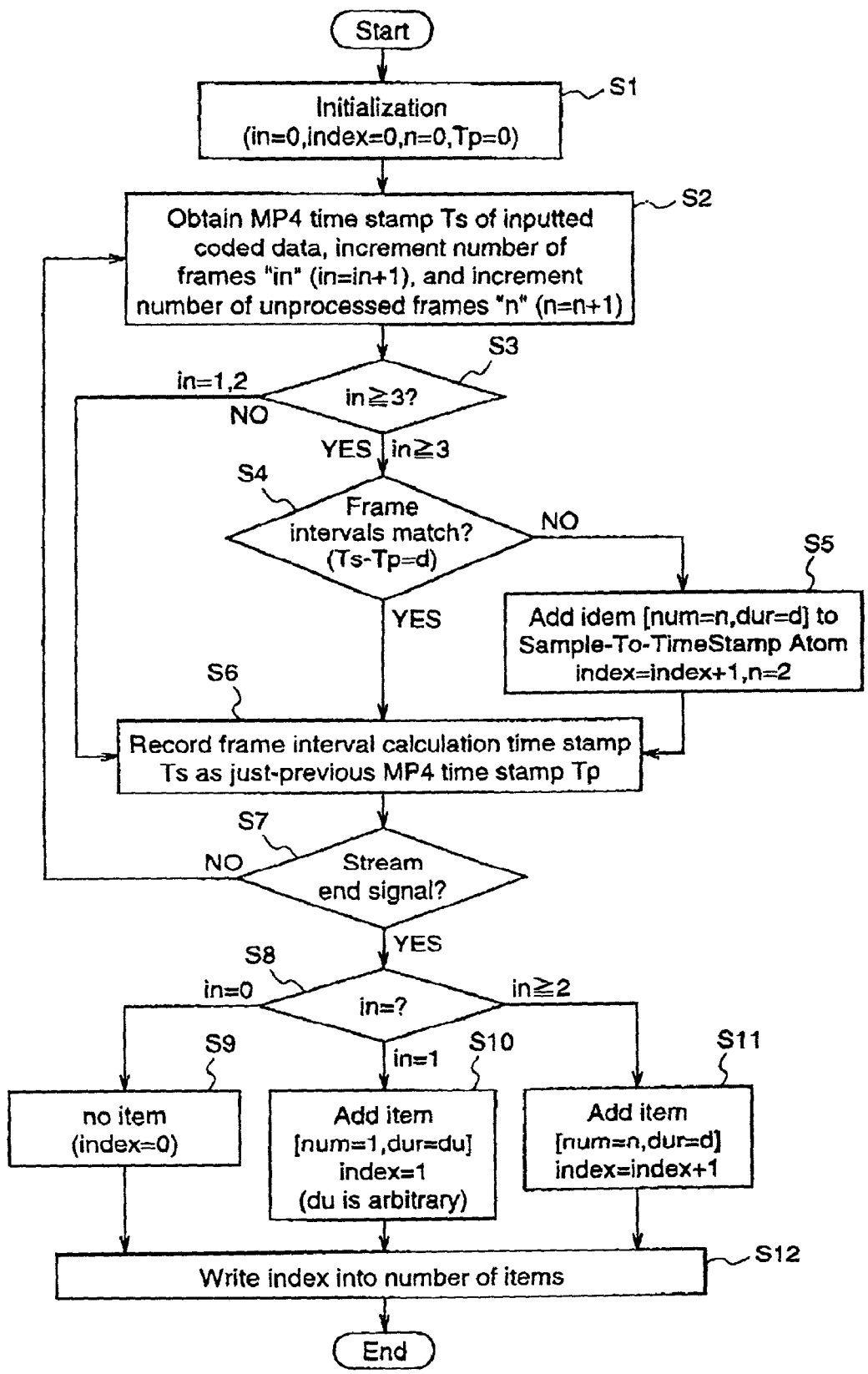
FIG. 14 is a flowchart for explaining a sequential flow of processes performed by the conventional MP4 file coding means.
Figure 15:
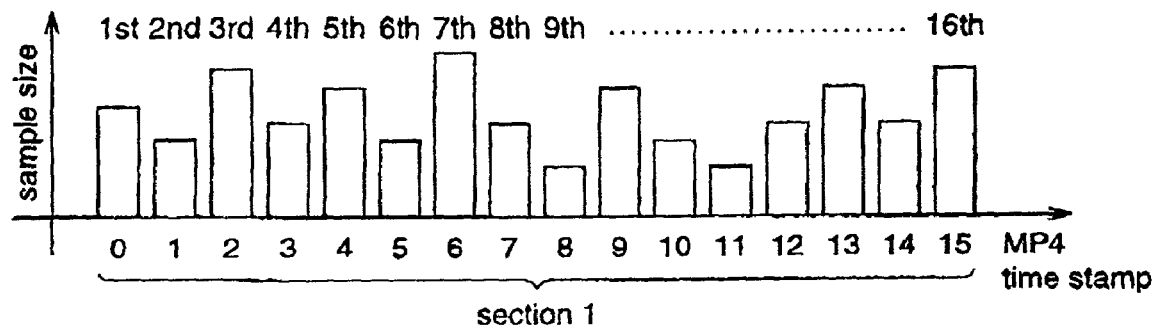
FIGS. 15(a) and 15(b) are diagrams illustrating fixed-frame-rate coded data (15(a)), and the construction of an MP4 file (15(b)).

With reference to FIGS. 2 and 3(a)-3(c), the fixed FPS means 104 comprises a non-updation frame insertion means 201, a size 0 frame insertion means 202, and a coded data time stamp continuation means 203. The fixed FPS means 104 inserts fictitious frames in the positions of time stamps where coded data inputted at a variable frame rate have conventionally been skipped, i.e., the MP4 time stamps 1, 3, 5, . . . of the variable-frame-rate coded data shown in FIG. 12 where the coded data are absent (skipped), thereby converting the variable-frame-rate coded data into fixed-frame-rate coded data.

In the fixed FPS means 104, frame insertion means 201 comprises a processing means which outputs a switch signal to a switch 314, a non-updation frame formation means 312 which generates a non-updation frame, a temporary storage means 313 which holds the data stored in the coded data temporary storage means 101, and a switch 314 which selects either the non-updation frame formation means 312 or the temporary storage means 313. The non-updation frame insertion means 201 inserts, as a fictitious frame described above, a non-updation frame which is a special sample meaning non-updation. The non-updation frame is coded data which does not include information about a difference in video signals between itself and a previous frame, for example, it is a frame in which vop_coded in a VOP header is 0. Since the non-updation, frame includes no differential information (e.g., vop_coded=0), the amount of data is several tens of bytes, and this is smaller than the amount of data of an ordinary coded frame. Further, also the non-updation frame has a field of a coded data time stamp like an ordinary frame, and the non-updation frame insertion means 201 gives an arbitrary value to this field. Further, there are cases where vop_coded=0 does not mean non-updation in the non-updation frame, depending on presence/absence of shape coding or presence/absence of a transparency channel. In this case, a frame in which all macroblocks are in the state of MB_not_coded is outputted.

Further, in the fixed FPS means 104, the size 0 frame insertion means 202 comprises a processing means 321 which outputs a switch signal to a switch 324, a size 0 frame formation means 322 which generates a frame of size 0, a temporary storage means 323 which holds the coded data stored in the coded data temporary storage means 101, and a switch 324 which selects either the size 0 frame formation means 322 or the temporary storage means 323. The size 0 frame insertion means 202 inserts, as a fictitious frame described above, a size 0 frame which is a sample whose size is 0. The size 0 frame is a frame whose data size is 0, having no significant value of coded data.

Furthermore, in the fixed FPS means 104, the coded data time stamp continuation means 203 includes a coded data time stamp rewriting means 331 which converts the coded data time stamp of the coded data outputted from the non-updation frame insertion means 201 or the size 0 frame insertion means 202 into a correct coded data time stamp, according to the MP4 time stamp of the non-updation frame or the size 0 frame, on the basis of the standard of the coded data, thereby overwriting the coded data time stamp. The coded data time stamp continuation means 203 further includes a temporary storage means 332 for holding the coded data and the amounts of coded data which are outputted from the respective means 201 and 202.

When the MP4 file recorded on the recording medium 120 is decoded, only the MP4 time stamp is usually referred to, and therefore, the value of the coded data time stamp of the corresponding frame does not much matter. However, when forming a file or the like comprising only the coded data from the MP4 file, such file cannot be formed unless the coded data time stamp of the coded data is correct, and therefore, a correct coded data time stamp must be reattached. The coded data time stamp continuation means 203 performs the process of replacing the coded data time stamp which has been attached to the frame with a correct coded data time stamp, on assumption that the above-mentioned file will be generated from the MP4 file.

Since the MP4 file coding means 110 and the recording medium 120 are identical in constructions to those already described for the conventional data coding apparatus, repeated description is not necessary.

Hereinafter, a sequential processing operation of the data conversion apparatus 100 according to the first embodiment will be described with reference to FIGS. 4 to 6. It is assumed that coded data to be inputted to the apparatus 100 are only I-VOPs or P-VOPs, for simplification.

Figure 4:
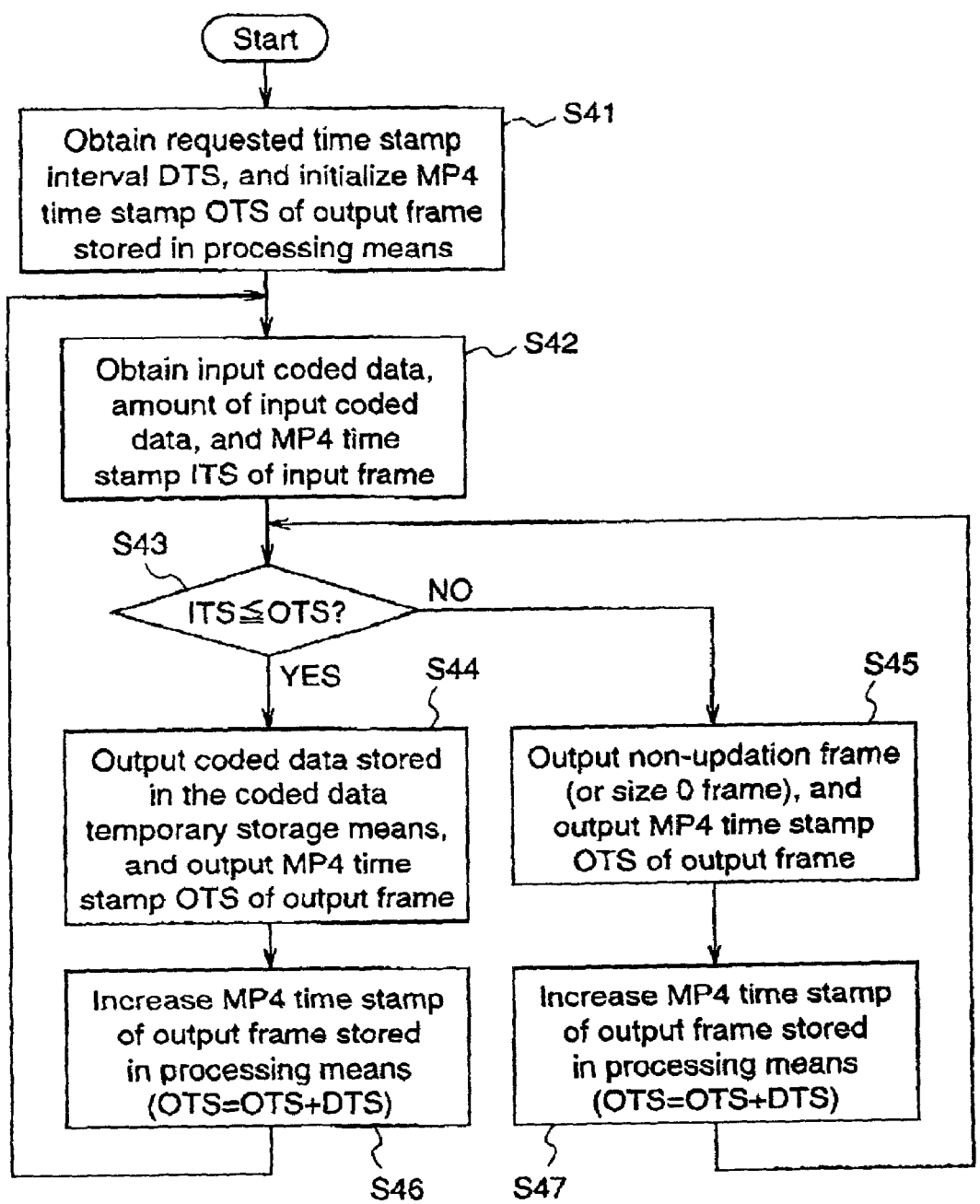
FIG. 4 is a flowchart for explaining a sequential flow of processes performed by the fixed FPS means of the data conversion apparatus according to the first embodiment.

FIG. 4 is a flowchart illustrating a sequential operation of the non-updation frame insertion means or the size 0 frame insertion means according to the first embodiment.

Initially, when the data conversion apparatus 100 starts processing, coded data are stored in the coded data temporary storage means 101. Then, the coded data time stamp reading means 102 acquires a coded data time stamp from the coded data stored in the coded data temporary storage means 101. This acquisition of the coded data time stamp is carried out as follows. A scale (vop-time-increment-resolution) of the coded data time stamp is obtained from a VOL header attached before the first coded data or from VOL headers attached before coded data at intervals of several frames, and furthermore, an increment (modulo-time-base, vop-time-increment) of the coded data time stamp is obtained from a VOP header of each coded data, followed by appropriate calculation.

Thereafter, the time stamp conversion means 103 converts the coded data into an MP4 time stamp, and the coded data stored in the coded data temporary storage means 101 as well as the data size are outputted to the fixed FPS means 104.

On receipt of the coded data, data size, and MP4 time stamp, the fixed FPS means 104 converts the variable-frame-rate coded data into fixed-frame-rate coded data, according to the flowchart shown in FIG. 4.

First of all, the inputted coded data, the amount of coded data, and the MP4 time stamp ITS of the inputted frame are inputted to either the non-updation frame insertion means 201 or the size 0 frame insertion means 202 in the fixed FPS means 104.

Initially, a description will be given of the case where the coded data, the amount thereof, and the MP4 time stamp are inputted to the non-updation frame insertion means 201.

When the data conversion apparatus 100 starts processing, the processing means 311 of the non-updation frame insertion means 201 initializes the value of the MP4 time stamp OTS of the output frame being held, and obtains a requested time stamp interval DTS which is inputted as an initial condition from the outside (step S41). When the coded data and the amount thereof are supplied from the coded data temporary storage means 101 and the MP4 time stamp is supplied from the time stamp conversion means 103, the coded data and the data size are stored in the temporary storage means 313, and the MP4 time stamp is inputted to the processing means 311 as the MP4 time stamp ITS of the input frame (step S42).

Thereafter, in the processing means 311, the MP4 time stamp ITS of the input frame obtained in step S42 is compared with the MP4 time stamp OTS of the output frame stored in the processing means 311 (step S43).

When ITS≦OTS in step S43, a switch signal is outputted from the processing means 311 so as to select the temporary storage means 313, and the coded data stored in the temporary storage means 313 and the MP4 time stamp ITS of the coded data are rewritten to the MP4 time stamp OTS of the output frame stored in the processing means 311 (step S44). Thereafter, the requested time stamp interval DTS is added to the MP4 time stamp of the output frame stored in the processing means 311 to obtain the MP4 time stamp OTS of the next output frame.

On the other hand, when ITS≧OTS in step S43, a switch signal is outputted from the processing means 311 so as to select the non-updation frame formation means 312, and the non-updation frame generated by the non-updation frame formation means 312 and the MP4 time stamp OTS of the output frame stored in the processing means 311 are outputted. Thereafter, as described above, the requested time stamp interval DTS is added to the MP4 time stamp of the output frame stored in the processing means 311 to obtain the MP4 time stamp OTS of the next output frame.

After the above-mentioned processing, the coded data outputted from the non-updation frame insertion means 201 is finally recorded as an MP4 file on the recording medium 120. However, in the case where, after recording of the MP4 file on the recording medium 120, the MP4 file will be utilized such that only the coded data is extracted from the MP4 file to form an original file of the coded data alone, all of the coded data recorded on the MP4 file must have correct coded data time stamps. Therefore, the coded data time stamp continuation means 203 is selected, and the coded data time stamp rewriting means 331 converts the coded data time stamp possessed by the inputted coded data into a correct coded data time stamp by using the MP4 time stamp and, thereafter, the field which holds the coded data time stamp in the coded data stored in the temporary storage means 322 is overwritten with the correct coded data time stamp which is formed by the coded data time stamp rewiring means 331.

When there is no necessity to covert the coded data time stamp into a correct value, the coded data time stamp continuation means 203 is not selected, and the coded data, the amount thereof, and the MP4 time stamp are outputted as they are.

Then, the coded data, the data amount, and the MP4 time stamp which are outputted from the fixed FPS means 104 are inputted to the MP4 file coding means 110, wherein the coded data is converted into an MP4 file by performing the same processing as the conventional one, and the MP4 file is recorded on the recording medium 120.

Hereinafter, a description will be given of the structures of the coded data and the MP4 file, which are obtained through the non-updation frame insertion means 201, with reference to FIGS. 5(a)-(b) and 12(a)-12(b).

FIGS. 5(a) and 5(b) shows the coded data and the data structure of the MP4 file, respectively, when the coded data passes through the non-updation frame insertion means and is recorded as the MP4 file.

As shown in FIGS. 5(a) and 5(b), the coded data which have been converted into the fixed-frame-rate coded data by the data conversion apparatus 100 have a fixed time stamp interval, in relation to the case of the conventional variable frame rate shown in FIGS. 12(a)-12(b), whereby the number of items in the Sample-To-TimeStamp Atom becomes one. However, since the non-updation frames are inserted in the positions corresponding to the MP4 time stamps which have conventionally been skipped, the Movie Data Atom and the Sample Size Atom are increased.

Further, since the number of items in the Sample-To-TimeStamp Atom is always one, calculation of the frame number from the MP time stamp or calculation of the MP time stamp from the frame number is facilitated.

For example, assuming that the MP4 time stamp is T, the frame number is N, and the frame interval dur is d, a relationship of T=d*N holds and, therefore, calculation of the frame number from the MP4 time stamp is N=T/d while calculation of the MP4 time stamp from the frame number is T=d*N. Accordingly, the frame number or the MP4 time stamp can be calculated by one division or multiplication.

In the fixed FPS means 104, the data structure of the MP4 file is not dependent on whether the coded data, the data size, and the MP4 time stamp, which are outputted from the respective means 201 and 202, pass through the coded data time stamp continuation means 203 or not, and the same MP4 file structure is obtained in either case. This is because the MP4 time stamp of the MP4 file is decided independently of the coded data, and there is no problem in view of the standard.

Next, a description will be given of the case where the coded data, the amount of coded data, and the MP4 time stamp are inputted to the size 0 frame insertion means 202.

Also in this case, the inputted data and information are processed along the flowchart of FIG. 4 as in the case of the non-updation frame insertion means 201. The size 0 frame insertion means 202 is different from the non-updation frame insertion means 201 only in that it inserts a frame whose size is 0 in place of a non-updation frame.

Hereinafter, a description will be given of the coded data and the structure of the MP4 file, which are obtained through the size 0 frame insertion means 202, with reference to FIGS. 6(a)-6(b) and 12(a)-12(b).

FIGS. 6(a) and 6(b) are diagrams illustrating the coded data and the data structure of the MP4 file, respectively, when the coded data passes through the size 0 frame insertion means 202 and recorded as the MP4 file.

As shown in FIGS. 6(a) and 6(b), the coded data converted into the fixed-frame-rate coded data by the data conversion apparatus 100 has only one item in the Sample-To-TimeStamp Atom, in relation to the conventional variable-frame-rate coded data shown in FIGS. 12(a)-12(b). Further, in contrast to the non-updation frame insertion means 201, the size 0 frame insertion means 202 inserts a frame whose size is 0, and no coded data is added. Therefore, the table size of the Movie Data Atom is the same as that of the conventional variable-frame-rate coded data. However, as for the table size of the Sample Size Atom, since an item indicating that the frame size is 0 is added to the Sample size Atom as in the case of the non-updation frame insertion means 201, the table size becomes larger than that of the conventional variable-frame-rate coded data.

Further, since the number of items in the Sample-To-TimeStamp Atom is always one as in the case of the non-updation frame insertion means 201, calculation of the frame number from the MP time stamp or calculation of the MP time stamp from the frame number is facilitated.

As in the case of the non-updation frame insertion means 201, the data structure of the MP4 file is not dependent on whether or not the coded data passes through the coded data time stamp continuation means 203 in the fixed FPS means 104.

As is evident from the above description, the effect that the variable-frame-rate coded data can be converted into the fixed-frame-rate coded data is obtained regardless of whether the coded data, the amount of coded data, and the MP4 time stamp are inputted to the non-updation frame rate insertion means 201 or the size 0 frame insertion means 202. However, since size 0 frames are inserted in the coded data when the size 0 frame insertion means 202 is selected, decoding might become impossible depending on the decoding apparatus. Accordingly, when prime importance is placed on the portability of data, the coded data, the data size, and the MP4 time stamp should be inputted to the non-updation frame rate insertion means 201 rather than the size 0 frame insertion means 202.

As described above, according to the first embodiment of the invention, when the inputted variable-frame-rate coded MPEG-4 data is recorded as an MP4 file on the recording medium 120, the variable-frame-rate coded data is transmitted through the fixed FPS means 104 to insert non-updation frames or size 0 frames in the positions of MP4 time stamps which have conventionally been skipped, thereby converting the variable-frame-rate coded data into the fixed-frame-rate coded data, and thereafter, the coded data is converted into an MP4 file by the MP4 file coding means 110, and the MP4 file is recorded on the recording medium 120. Therefore, the number of items in the Sample-To-TimeStamp Atoms is always one as in the case of the fixed-frame-rate coded data, and the table size of the Sample-To-TimeStamp Atom is not dependent on the coded data, whereby the data of the MP4 file can be restored completely even when an abnormal condition occurs in the data conversion apparatus 100.

Further, since the table size of the Sample-To-TimeStamp Atom is fixed, the volume of processing required when reproducing the data recorded as the MP4 file on the recording medium 120 can be reduced.

Moreover, even when the data conversion apparatus 100 according to the first embodiment is mounted on a mobile terminal whose physical size, power consumption, and capacity of a recording medium are significantly restricted, and an MP4 file is recorded on the recording medium in the mobile terminal, since the number of items on the table of the Sample-To-TimeStamp Atom is fixed to one, various problems which may be caused by, for example, insufficient capacity of the recording medium in the mobile terminal, are avoided.

In this first embodiment, ITS≦OTS is employed as the condition of judgement in step S43 of FIG. 4 as to whether the inputted coded data should be outputted as it is or a non-updation frame or a size 0 frame should be inserted in the coded data. However, usually, the input time stamp ITS added to the coded data inputted to the data coding apparatus does not accurately agree with a multiple of the requested time stamp interval DTS, but it fluctuates to and fro, i.e., ITS=n*OTS±α (n: integer), where α indicates a component of fluctuation.

The fluctuation is caused by that the frame interval of a TV signal of the NTSC system is 1001/30000=0.033366666 . . . sec. (29.970029 . . . Hz), which is indivisible, and therefore, rounding is carried out by each equipment when generating coded data. The method of rounding (rounding to the nearest whole number, rounding down, and rounding up) and the number of digits of the frame interval depend on each equipment, and this information cannot be known at MP4 recording.

Hereinafter, a description will be given of the case where a fluctuation occurs for the reason mentioned above, with reference to FIGS. 7(a) and 1(b). FIGS. 7(a) and 7(b) are diagrams illustrating the states where the time stamp ITS given to the input frame slightly fluctuates to and fro, when the judgement condition is ITS≦OTS (FIG. 7(a)) and it is ITS≦OTS+DTS/2 (FIG. 7(b)). It is assumed that the requested time stamp interval DTS=100.

As shown in FIG. 7(a), when the judgement condition is ITS≦OTS, if ITS fluctuates to be smaller than OTS like the (n−1)th frame, this (n−1)th frame is judged as a frame of a correct OTS (=800), presenting no problem. However, if ITS fluctuates, even a little, to be larger than OTS like the n-th frame, this n-th frame is judged not as a frame of a correct OTS (=900) but as a frame of a next OTS (=1000).

In this case, when the judgement condition in step S43 shown in FIG. 4 is ITS≦OTS+DTS/2, the n-th frame is judged as a frame of a correct OTS (=900) as shown in FIG. 7(b), and the fluctuation which occurs for the above-mentioned reason can be resolved before the coded data are converted and MP4-recorded on the recording medium 120. Although ITS is compared with OTS+DTS/2 as an example of the judgement condition, a fixed value other than DTS/2 may be added to OTS.

Embodiment 2

Hereinafter, a data coding apparatus according to a second embodiment of the present invention will be described with reference to FIG. 7.

While in the first embodiment the description has been made of a data conversion apparatus which converts variable-frame-rate coded MPEG-4 video data into fixed-frame-rate coded data, in this second embodiment a description will be given of a data coding apparatus which receives an uncoded video signal supplied from a camera or the like, encodes the video signal into fixed-frame-rate coded data, and records the coded data as an MP4 file.

First of all, the construction of a data coding apparatus 200 according to the second embodiment will be described with reference to FIG. 8.

Figure 8:
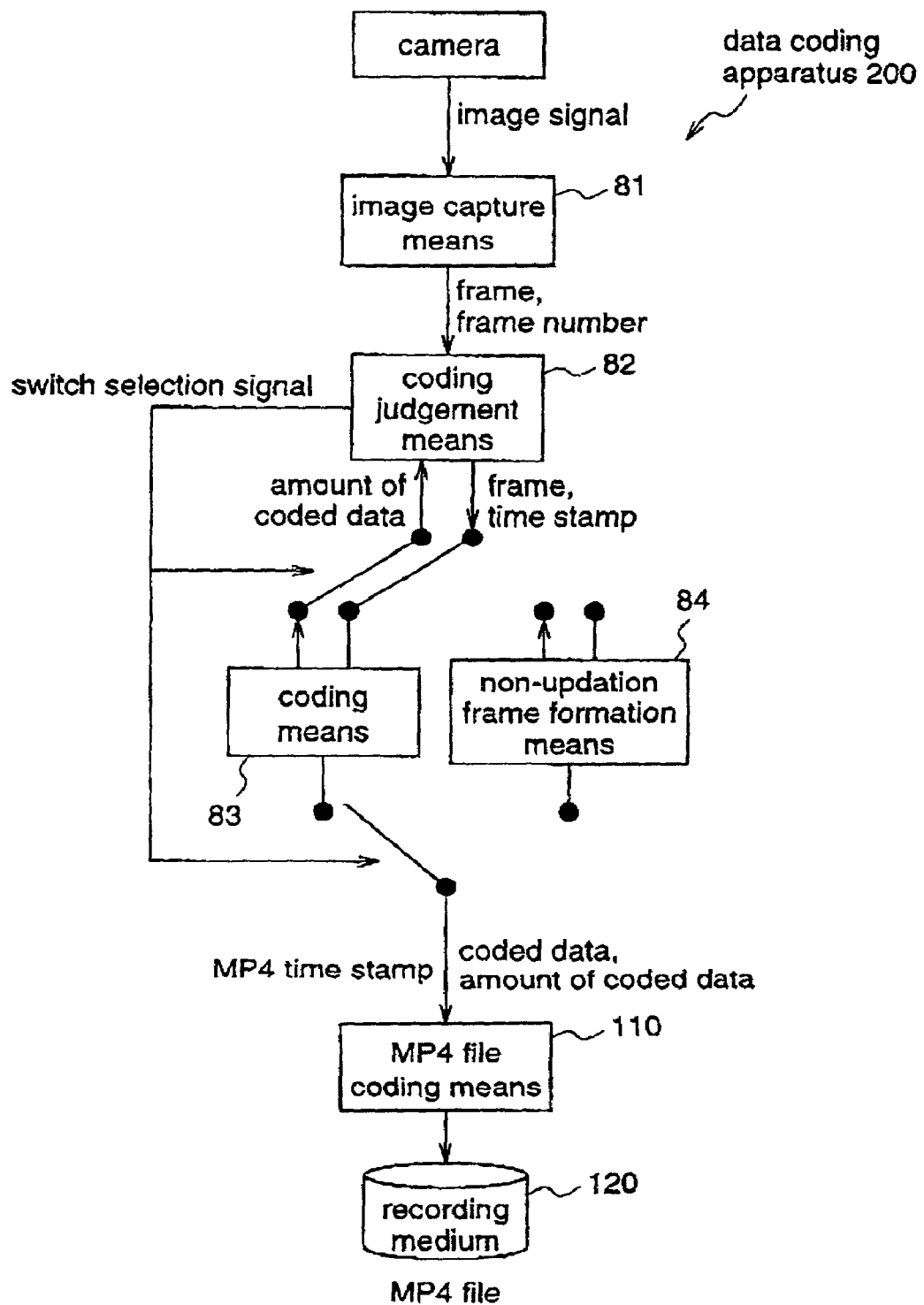
FIG. 8 is a block diagram illustrating the construction of a data coding apparatus according to a second embodiment of the present invention.

FIG. 8 is a block diagram illustrating the construction of the data coding apparatus 200 according to the second embodiment.

Figure 11:
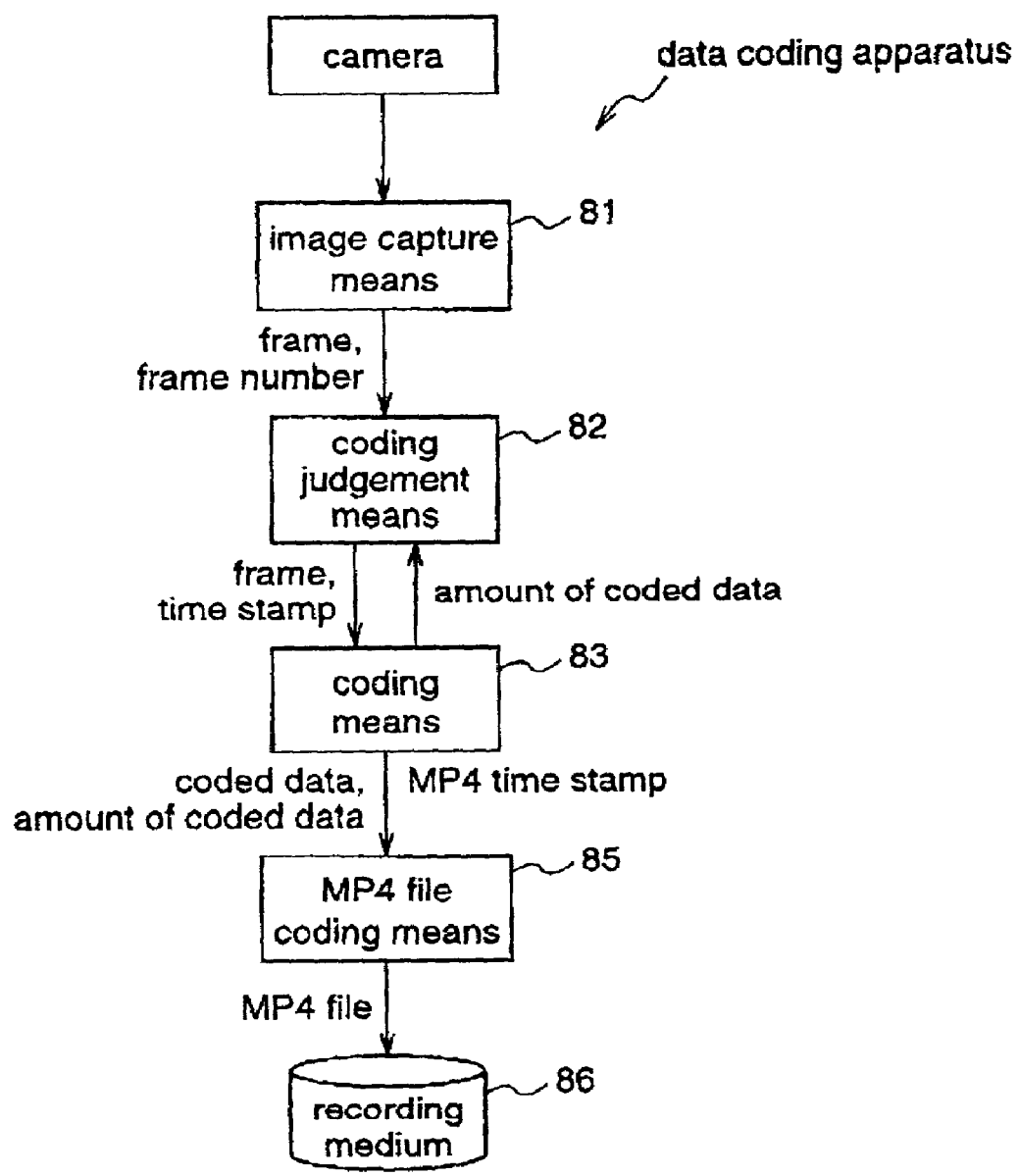
FIG. 11 is a block diagram illustrating the construction of a conventional data coding apparatus.

With reference to FIG. 8, the data coding apparatus 200 is obtained by providing the conventional data coding apparatus shown in FIG. 11 with a non-updation frame formation means 84. The above-mentioned coding judgement means 82 judges whether a captured frame is to be coded or not, and outputs a switch selection signal for selecting either the coding means 83 or the non-updation frame formation means 84 on the basis of the result of judgement. Since other constituents are identical to those of the conventional data coding apparatus, repeated description is not necessary.

The non-updation frame formation means 84 generates a non-updation frame as described for the first embodiment, and inserts an MP4 time stamp. A coded data time stamp of a non-updation frame is given an arbitrary value in the non-updation frame formation means 84, as in the first embodiment.

Hereinafter, the processing operation of the data coding apparatus 200 according to the second embodiment will be described.

Initially, in the data coding apparatus 200, an image supplied from a camera is converted into frames by the image capture means 81, and each frame is outputted to the coding judgement means 82, together with the frame number which increments at the frame rate of the camera, from starting of the image capturing.

In the coding judgement means 82, an MP4 time stamp of the inputted frame is calculated on the basis of the frame number and the frame information of the camera, which has previously been given, and it is judged whether the inputted frame is to be coded or not on the basis of the time stamp, the total amount of data which have already been coded, and the output bit rate. The processing up to here is identical to that described for the conventional apparatus.

When the coding judgement means 82 judges that the inputted frame is to be coded, the coding judgement means 82 outputs a switch selection signal for selecting the coding means 83, and outputs the frame supplied from the camera and the time stamp of this frame to the coding means 83.

After coding of the frame is carried out by the coding means 83, the coded data, the amount of coded data, and the MP4 time stamp are outputted to the MP4 file coding means 110.

On the other hand, when the coding judgement means 82 judges that the inputted frame is not to be coded, the coding judgement means 82 outputs a switch selection signal for selecting the non-updation frame formation means 84. In the non-updation frame formation means 84, a non-updation frame is generated, and an MP4 time stamp of the non-updation frame is inserted, and the non-updation frame, the size of the non-updation frame, and the MP4 time stamp are outputted to the MP4 file coding means 110. The non-updation frame is identical to that described for the first embodiment.

Figure 5:
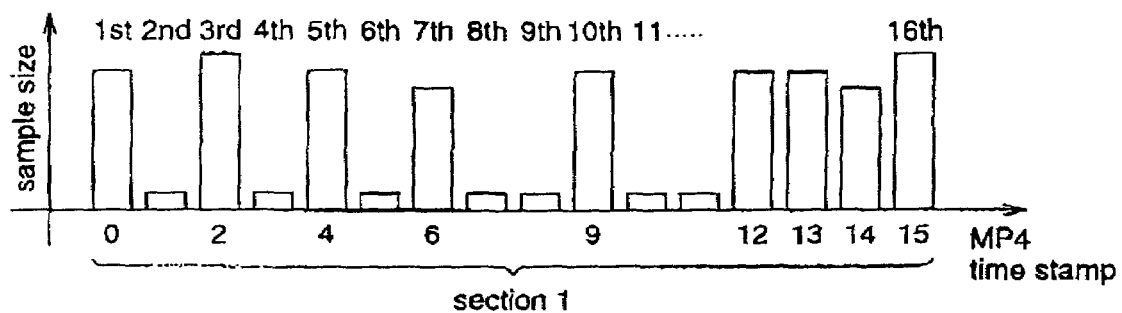
FIGS. 5(a) and 5(b) are diagrams illustrating coded data (5(a)) and the construction of an MP4 file (5(b)) which are formed by the non-updation frame insertion means in the data conversion apparatus according to the first embodiment.
Figure 5:
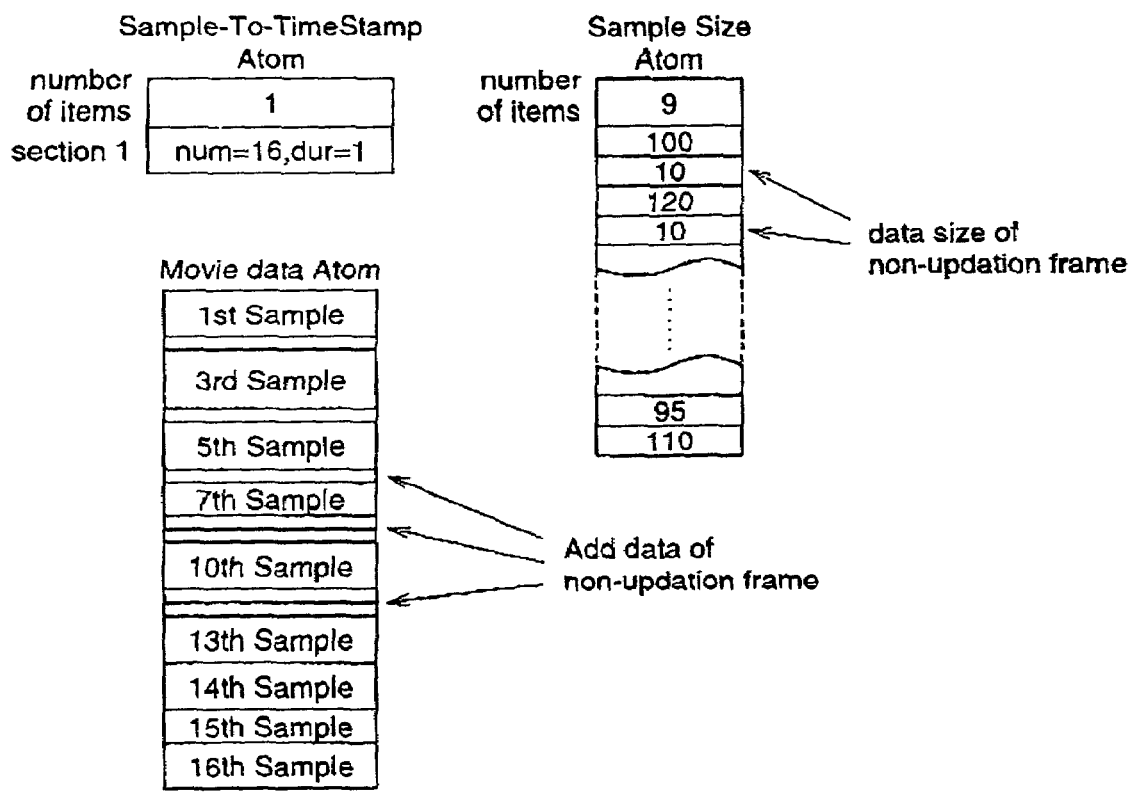
Figure 6:
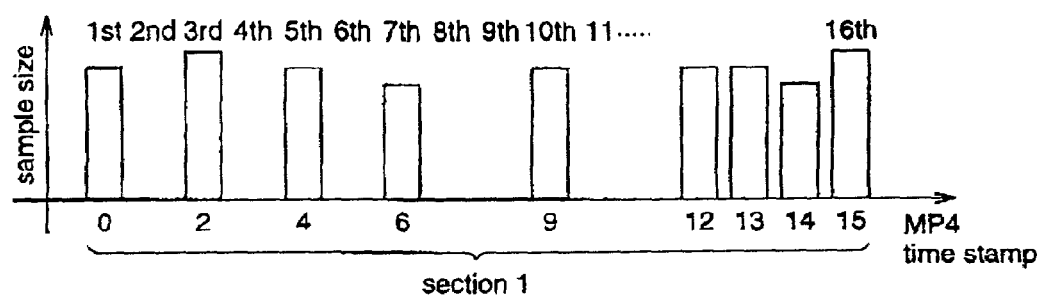
FIGS. 6(a) and 6(b) are diagrams illustrating coded data (6(a)) and the construction of an MP4 file (6(b)) which are formed by the size 0 frame insertion means in the data conversion apparatus according to the first embodiment.
Figure 6:
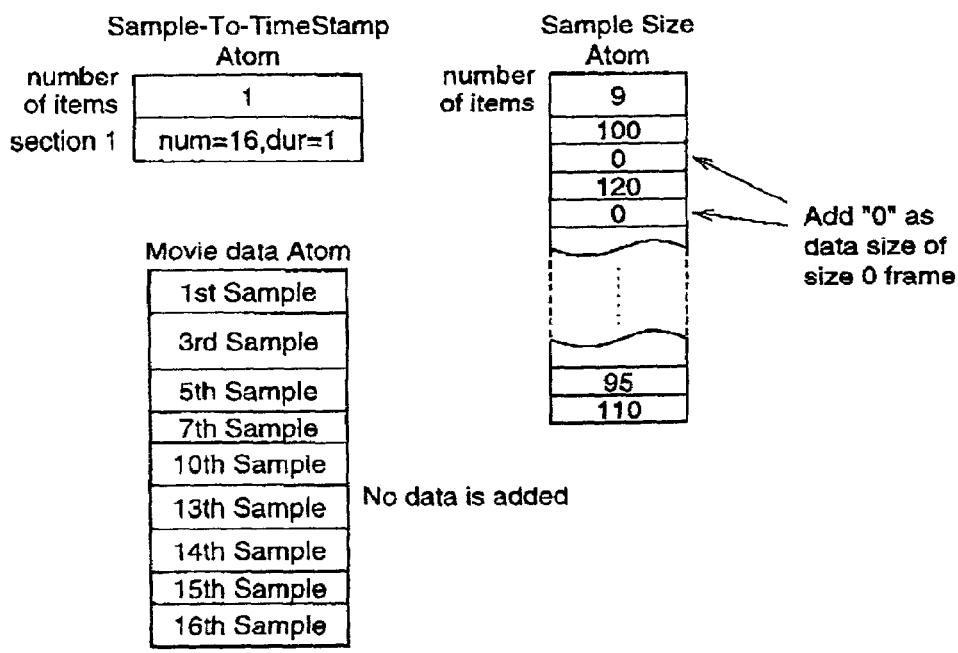

Thereafter, in the MP4 file coding means 110, the coded data or the non-updation frame which is outputted from the coding means 83 or the non-updation frame formation means 84 is converted into an MP4 file, and the MP4 file is recorded on the recording medium 120 (refer to FIGS. 5(*a*)-5(*b*)).

Further, in the above description, the non-updation frame formation means 84 inserts the non-updation frame in the position corresponding to the MP4 time stamp where data has conventionally been skipped, according to the judgement of the coding judgement means 82. However, the data coding apparatus 200 may be provided with, instead of the non-updation frame formation means 84, a size 0 frame formation means (not shown) which generates a frame whose size is 0, and inserts an MP4 time stamp of the size 0 frame. In this case, according to the judgement of the coding judgement means 82, a size 0 frame is inserted in the position corresponding to the MP4 time stamp where data has conventionally been skipped, whereby the same effect as that obtained by the non-updation frame formation means 84 is achieved (refer to FIGS. 6(*a*)-c(*b*)). When the coded data in which the size 0 frame is inserted by the size 0 frame formation means is converted into an MP4 file and the MP4 file is recorded on the recording medium 120, the size of the MP4 file is reduced as compared with the MP4 file obtained by the non-updation frame formation means 84. However, there is the possibility that the MP4 file obtained by the size 0 frame formation means 84 cannot be decoded depending on the decoding apparatus. Accordingly, when prime importance is played on the portability of data, the data coding apparatus 200 should be provided with the non-updation frame formation means 84 rather than the size 0 frame formation means 84.

When a file or the like comprising only the coded data is formed from the MP4 file recorded on the recording medium 120, such file cannot be formed unless the coded data time stamp of the coded data is correct. Therefore, when formation of such file from the MP4 file is assumed, the data recording apparatus 200 should be provided with a coded data time stamp continuation means 203, which has been described for the first embodiment, between the coding means 83 or the non-updation frame formation means 84 (or the size 0 frame formation means) and the MP4 file coding means 110. The coded data time stamp continuation means 203 converts the coded data time stamp of the coded data outputted from the coding means 83 or the non-updation frame formation means 84 into a correct coded data time stamp by using the MP4 time stamp, and writes the correct coded data time stamp over the existing time stamp.

As described above, according to the second embodiment of the invention, when a video signal supplied from a camera is coded, initially, it is judged by the coding judgement means 82 whether the inputted video signal is to be coded or not. When it is judged that the inputted video signal is to be coded, the video signal is coded by the coding means 83. When it is judged that the inputted video signal is not to be coded, a non-updation frame or a size 0 frame is formed by the non-updation frame formation means 84 or the size 0 frame formation means (not shown), and the frame is inserted in a position where data has conventionally been skipped. Therefore, when the coded data are converted into an MP4 file by the MP4 file coding means 110 and the MP4 file is recorded on the recording medium 120, the number of items on the Sample-To-TimeStamp Atom can be made one as in the case of the fixed frame rate. As the result, the table size of the Sample-To-TimeStamp Atom is not dependent on the coded data, whereby the data of the MP4 file can be completely restored even when an abnormal condition occurs in the data coding apparatus 200.

Furthermore, since the table size of the Sample-To-TimeStamp Atom is fixed, the volume of processing required when reproducing the data recorded as the MP4 file on the recording medium 120 can be reduced.

Moreover, even when the data coding apparatus 200 according to the second embodiment is mounted on a mobile terminal whose physical size, power consumption, and capacity of a recording medium are significantly restricted, since the number of items on the table of the Sample-To-TimeStamp Atom is fixed to one, various problems which may be caused by, for example, insufficient capacity of the recording medium, are avoided.

Embodiment 3

Hereinafter, a data recording apparatus according to a third embodiment of the present invention will be described with reference to FIG. 9.

While in the first embodiment the description has been given of a data conversion apparatus which converts variable-frame-rate coded MPEG-4 video data into fixed-frame-rate coded data, in this third embodiment a description will be given of a data recording apparatus which receives MPEG-4 data transmitted from a base station by using RTP (Real-time Transport Protocol), decodes the data, and records the data as an MP4 file on a recording medium.

First of all, the construction of the data recording apparatus 300 according to the third embodiment will be described with reference to FIG. 9.

Figure 9:
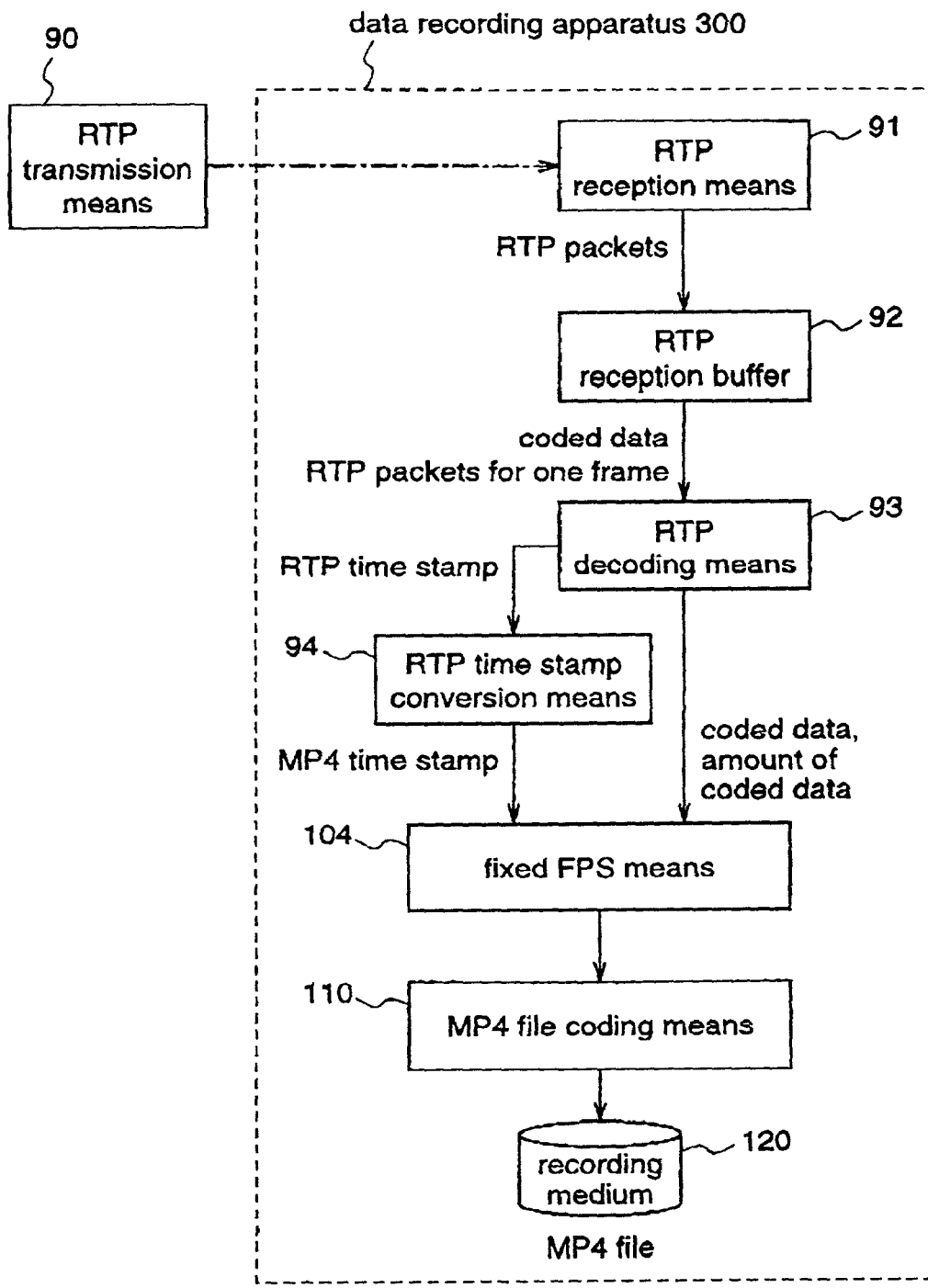
FIG. 9 is a block diagram illustrating tie construction of a data recording apparatus according to a third embodiment of the present invention.
Figure 10:
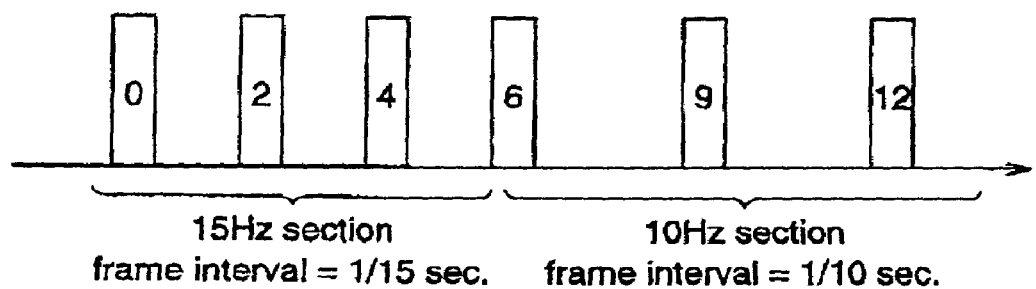
FIG. 10 is a diagram illustrating frame-to-frame intervals of conventional variable-frame-rate coded data.

FIG. 9 is a block diagram illustrating the construction of the data recording apparatus 300 according to the third embodiment.

Figure 17:
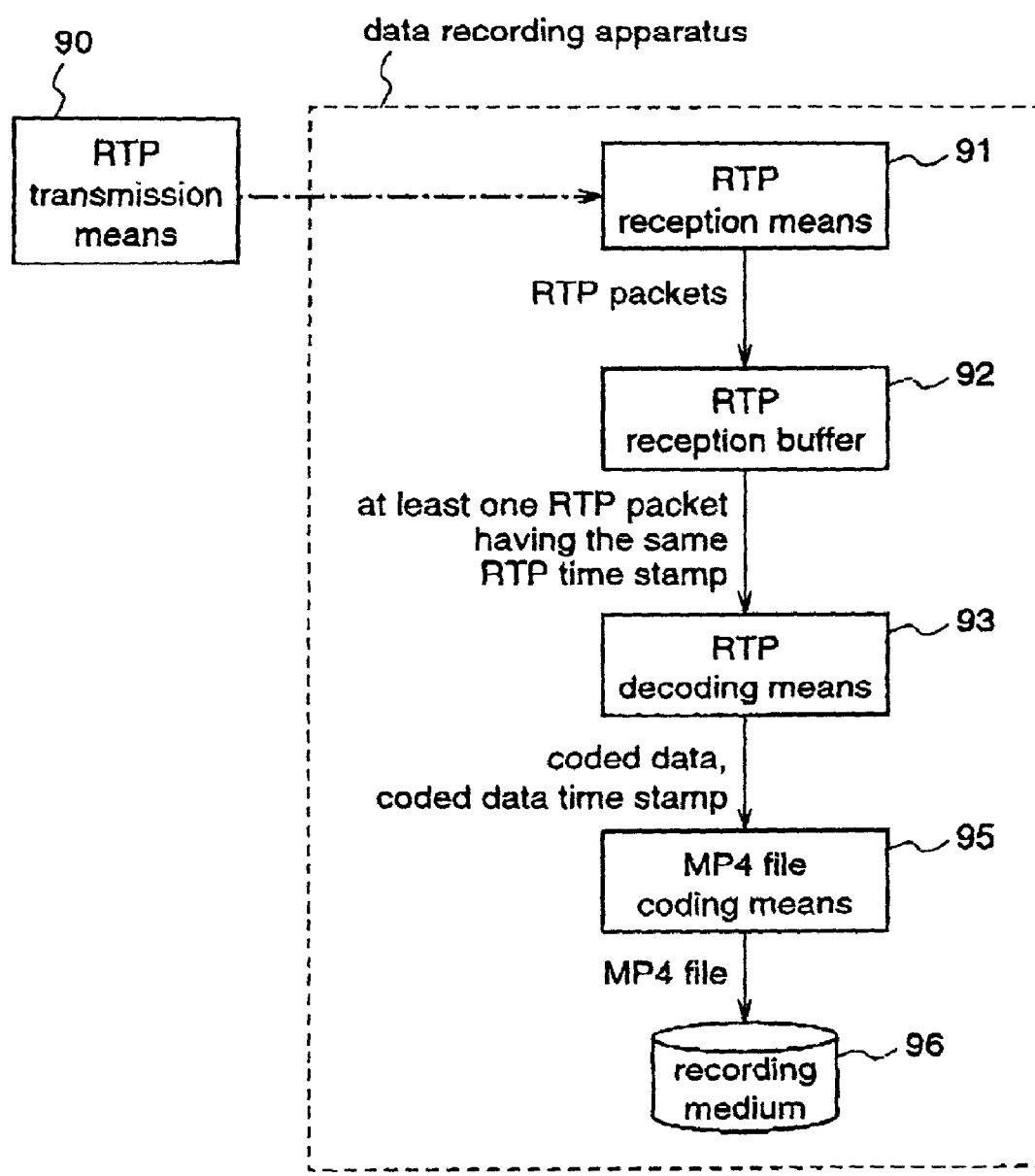
FIG. 17 is a block diagram illustrating the construction of a conventional data recording apparatus as a mobile terminal.

With reference to FIG. 9, the data recording apparatus 300 is obtained by providing the conventional data recording apparatus shown in FIG. 17 with an RTP time stamp conversion means 94 and a fixed FPS means 104. The RTP time stamp conversion means 94 converts RTP time stamps, which are time stamps of RTP packets obtained by the RTP decoding means 83, into MP4 time stamps in an expression form which is common to the respective embodiments of the present invention. The MP4 time stamps in an expression form common to the embodiments of the present invention are time stamps to be recorded in the Sample-To-TimeStamp Atom of the MP file in a form starting from 0.

The conversion from the RTP time stamps to the MP4 time stamps in the RTP time stamp conversion means 94 is carried out as follows. As described for the conventional data recording apparatus, since random offsets are added to the RTP time stamps, these offsets are subtracted from the RTP time stamps of all RTP packets so that the time stamp of the head coded data starts from 0, and further, multiplication and division are carried out so that the scale of the RTP time stamp becomes the scale of the MP4 time stamp which is common to the respective embodiments of the present invention.

Figure 3:
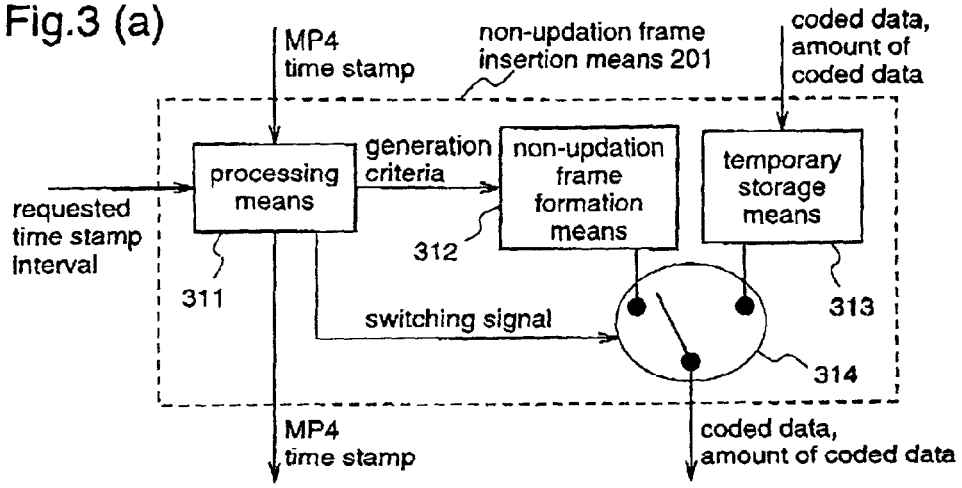
FIGS. 3(a)-3(c) are diagrams illustrating the constructions of a non-updation frame insertion means, a size 0 frame insertion means, and a coded data time stamp continuation means, which are included in the fixed FPS means of the data conversion apparatus according to the first embodiment.
Figure 3:
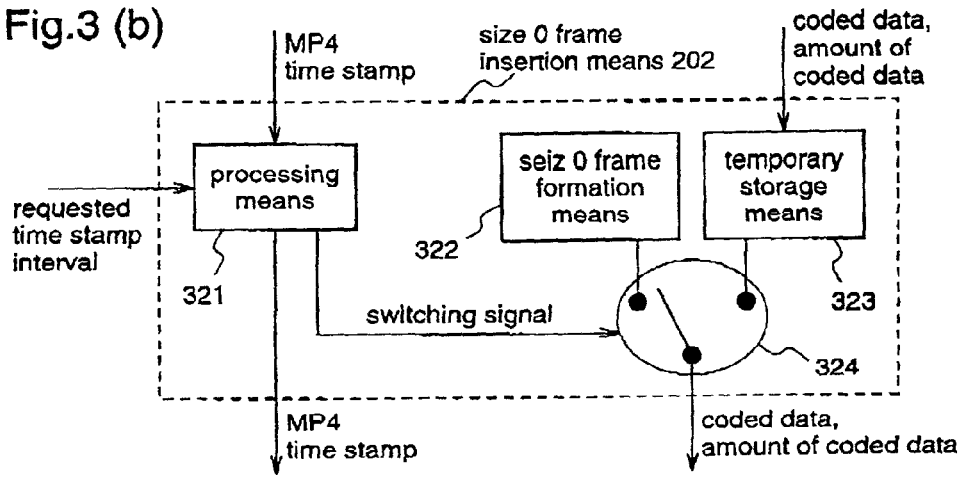
Figure 3:
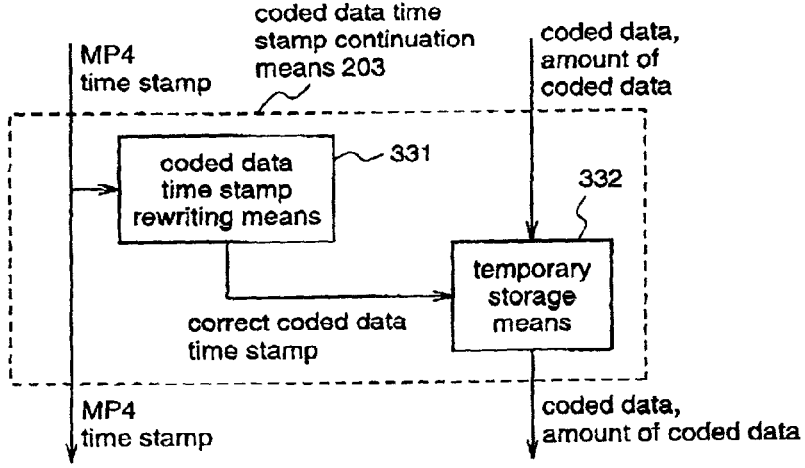

The fixed FPS means 104 has the same construction as that described for the first embodiment with reference to FIGS. 2 and 3, and other constituents of the data recording apparatus are identical in constructions to the conventional data recording apparatus and, therefore, repeated description is not necessary.

Hereinafter, a description will be given of a sequential processing operation of the data recording apparatus 300 having the above-described construction. Although this third embodiment will be described on assumption that the data recording apparatus 300 is a mobile terminal, the data recording apparatus 300 is not restricted to a mobile terminal. Any equipment may be employed so long as it receives data from a base station by using RTP, and records the data as an MP4 file.

Initially, MPEG-4 coded data supplied from the RTP transmission means 90 of the base station are divided into video packets, and RTP packets containing the respective video packets are received by the RTP reception means 91 of the data recording apparatus.

Then, an appropriate number of the RTP packets received by the RTP reception means 91 are temporarily stored in the RTP reception buffer 92.

The RTP reception buffer 92 resolves a phenomenon in which the order of the RTP packets is changed during transmission, by rearrangement. Further, when coded data corresponding to one frame are divided into plural RTP packets and transmitted, the RTP reception buffer 92 holds the RTP packets until more than one frame of RTP packets are stored.

The RTP packets taken out of the RTP reception buffer 92 are restored to MPEG-4 coded data by the RTP decoding means 93, and the coded data and the amount of coded data are outputted to the fixed FPS means 104 and, simultaneously, RTP time stamps are obtained from the RTP packets, and the RTP time stamps so obtained are outputted to the RTP time stamp conversion means 94.

The RTP time stamps outputted to the RTP time stamp conversion means 94 are converted into MP4 time stamps as described above, and the MP4 time stamps are outputted to the fixed FPS means 104.

Since the subsequent processes by the fixed FPS means 104 and the MP4 file coding means 110 are identical to those already described for the first embodiment, repeated description is not necessary.

As described above, according to the third embodiment of the present invention, the MPEG-4 data stored in the RTP packets which are transmitted from the RTP transmission means 90 by using RTP (Real-time Transport Protocol), are received by the RTP reception means 91, and these RTP packets are decoded to the MPEG-4 data by the RTP decoding means 93 and, simultaneously, RTP time stamps of the RTP packets are obtained. Then, the RTP time stamps are converted into MP4 time stamps by the RTP time stamp conversion means 94. The fixed FPS means 104 receives the coded data and the amount of coded data from the RTP decoding means 93 as well as the MP4 time stamps from the RTP time stamp conversion means 94, and inserts a non-updation frame or a size 0 frame in a position corresponding to an MP4 time stamp which has conventionally been skipped, thereby converting the data into fixed-frame-rate coded data. Thereafter, the coded data are converted into an MP4 file by the MP4 file coding means 110, and the MP4 file is recorded on the recording medium 120. Therefore, the number of items in the Sample-To-TimeStamp Atom can be made one as in the case of the fixed frame rate. As the result, the table size of the Sample-To-TimeStamp Atom is not dependent on the coded data, whereby the data of the MP4 file can be completely restored even when an abnormal condition occurs in the data recording apparatus 300.

Further, since the table size of the Sample-To-TimeStamp Atom is fixed, the volume of processing required when reproducing the data recorded in the MP4 file on the recording medium 120 can be reduced.

Furthermore, even when the data recording apparatus 300 according to the third embodiment is mounted on a mobile terminal whose physical size, power consumption, and capacity of a recording medium are significantly restricted, since the table size of the Sample-to-TimeStamp Atom is fixed, various problems caused by, for example, insufficient capacity of the recording medium, are avoided.

In this third embodiment, ITS≦OTS is employed as the condition of judgement as to whether the coded data obtained by decoding the PTP packet transmitted from the base station is to be outputted as it is or a non-updation frame or a size 0 frame is to be inserted in the coded data. However, as described for the first embodiment, usually the input time stamp ITS added to the RTP packet does not accurately agree with a multiple of the requested time stamp interval DTS, but it fluctuates to and fro. In this case, the judgement condition is set to ITS≦OTS+DTS/2 as described for the first embodiment, whereby the fluctuation which occurs for the above-mentioned reason can be resolved before MP4 recording of the data on the recording medium 120. Although ITS is compared with OTS+DTS/2 as an example of the judgement condition, a fixed value other than DTS/2 may be added to OTS.

What is claimed is:

1. A data conversion apparatus comprising:
   a temporary storage means for temporarily holding coded data of inputted video signal data;
   a time stamp reading means for reading an input time stamp which is time information of the coded data, from the coded data stored in the temporary storage means;
   a time stamp conversion means for converting the input time stamp of the coded data into a time stamp based on a fixed frame rate to be employed when outputting the coded data, said fixed frame rate being inputted from the outside as initial information; and
   a fixed frame rate conversion means for converting the coded data to which the time stamp based on the fixed frame rate is added, into coded data at the fixed frame rate.

2. The data conversion apparatus of claim 1, wherein said fixed frame rate conversion means comprises:
   a non-updation frame formation means for forming coded data having information indicating non-updation, and adding an arbitrary value as the input time stamp to the coded data which means non-updation; and
   a processing means for determining an output time stamp of the coded data outputted from the fixed frame rate conversion means, comparing the output time stamp with the time stamp based on the fixed frame rate, and performing control for selecting one of the temporary storage means and the non-updation frame formation means, on the basis of the result of the comparison; and
   said processing means performs a control so as to output the output time stamp and the coded data stored in the temporary storage means, when the output time stamp is equal to or larger than the time stamp based on the fixed frame rate, and
   performs a control so as to output the output time stamp, and the coded data which means non-updation and is outputted from the non-updation frame formation means, when the output time stamp is smaller than the time stamp based on the fixed frame rate.

3. The data conversion apparatus of claim 1, wherein said fixed frame rate conversion means comprises:
   a size 0 frame formation means for forming coded data which means that its size is 0, and adding an arbitrary value as the input time stamp to the coded data which means that its size is 0; and
   a processing means for determining an output time stamp of the coded data outputted from the fixed frame rate conversion means, comparing the output time stamp with the time stamp based on the fixed frame rate, and performing control for selecting one of the temporary storage means and the size 0 frame formation means, on the basis of the result of the comparison; and
   said processing means performs a control so as to output the output time stamp, and the coded data stored in the temporary storage means, when the output time stamp is equal to or larger than the time stamp based on the fixed frame rate, and
   performs a control so as to output the output time stamp, and the coded data which means that its size is 0 and is outputted from the size 0 frame formation means, when the output time stamp is smaller than the time stamp based on the fixed frame rate.

4. The data conversion apparatus of claim 2, wherein
   said processing means performs a control so as to output the output time stamp and the coded data stored in the temporary storage means, when a value obtained by adding an arbitrary value to the output time stamp is equal to or larger than the time stamp based on the fixed frame rate, and
   performs a control so as to output the output time stamp, and the coded data which means non-updation and is outputted from the non-updation frame formation means, when the value obtained by adding the arbitrary value to the output time stamp is smaller than the time stamp based on the fixed frame rate.

5. The data conversion apparatus of claim 3, wherein
   said processing means performs a control so as to output the output time stamp, and the coded data stored in the temporary storage means, when a value obtained by adding an arbitrary value to the output time stamp is equal to or larger than the time stamp based on the fixed frame rate, and
   performs a control so as to output the output time stamp, and the coded data which means that its size is 0 and is outputted from the size 0 frame formation means, when the value obtained by adding the arbitrary value to the output time stamp is smaller than the time stamp based on the fixed frame rate.

6. The data conversion apparatus of claim 2, wherein said fixed frame rate conversion means further includes a coded data time stamp continuation means for rewriting the input time stamp of the coded data outputted from the temporary storage means, and the input time stamp of the coded data which means non-updation and is outputted from the non-updation frame formation means, so as to make these input time stamps continuous, on the basis of the output time stamp.

7. The data conversion apparatus of claim 3, wherein said fixed frame rate conversion means further includes a coded data time stamp continuation means for rewriting the input time stamp of the coded data outputted from the temporary storage means, and the input time stamp of the coded data which means that its size is 0 and is outputted from the size 0 frame formation means, so as to make these input time stamps continuous, on the basis of the output time stamp.

8. A data recording apparatus comprising an RTP reception means for receiving transmitted RTP packets, an RTP reception buffer for temporarily holding the received RTP packets, and an RTP decoding means for restoring the RTP packets, which are stored in the RTP reception buffer and have the same RTP time stamp, to coded data; converting the coded data into a standard file format; and recording the file on a recording medium, said apparatus comprising:

a time stamp conversion means for obtaining the RTP time stamp from the RTP reception buffer, and converting the RTP time stamp into a time stamp based on a fixed frame rate to be employed when outputting the coded data, said fixed frame rate being supplied from the outside as initial information; and a fixed frame rate conversion means for converting the coded data to which the time stamp based on the fixed frame rate is added, into coded data of the fixed frame rate;

wherein the coded data of the fixed frame rate, which is outputted from the fixed frame rate conversion means, is converted into a standard file format to be recorded on the recording medium.

9. The data recording apparatus of claim 8, wherein said fixed frame rate conversion means comprises:

a non-updation frame formation means for forming coded data having information which means non-updation, and adding an arbitrary value as the input time stamp to the coded data which means non-updation;

a temporary storage means for temporarily holding the coded data from the RTP decoding means; and a processing means for determining an output time stamp of the coded data outputted from the fixed frame rate conversion means, comparing the output time stamp with the time stamp based on the fixed frame rate, and performing control for selecting one of the temporary storage means and the non-updation frame formation means on the basis of the result of the comparison; and said processing means performs a control so as to output the output time stamp and the coded data stored in the temporary storage means, when the output time stamp is equal to or larger than the time stamp based on the fixed frame rate, and performs a control so as to output the output time stamp, and the coded data which means non-updation and is outputted from the non-updation frame formation means, when the output time stamp is smaller than the time stamp based on the fixed frame rate.

10. The data recording apparatus of claim 8, wherein said fixed frame rate conversion means comprises:

a size 0 frame formation means for forming coded data which means that its size is 0, and adding an arbitrary value as the input time stamp to the coded data which means that its size is 0;

a temporary storage means for temporarily holding the coded data from the RTP decoding means; and a processing means for determining an output time stamp of the coded data outputted from the fixed frame rate conversion means, comparing the output time stamp with the time stamp based on the fixed frame rate, and performing control for selecting one of the temporary storage means and the size 0 frame formation means on the basis of the result of the comparison; and said processing means performs a control so that the output time stamp and the coded data stored in the temporary storage means are outputted when the output time stamp is equal to or larger than the time stamp based on the fixed frame rate, and performs a control so that the output time stamp and the coded data which means that its size is 0 and is outputted from the size 0 frame formation means are outputted when the output time stamp is smaller than the time stamp based on the fixed frame rate.

11. The data recording apparatus of claim 9, wherein said processing means performs a control so as to output the output time stamp and the coded data stored in the temporary storage means, when a value obtained by adding an arbitrary value to the output time stamp is equal to or larger than the time stamp based on the fixed frame rate, and performs a control so as to output the output time stamp, and the coded data which means non-updation and is outputted from the non-updation frame formation means, when the value obtained by adding the arbitrary value to the output time stamp is smaller than the time stamp based on the fixed frame rate.

12. The data recording apparatus of claim 10, wherein said processing means performs a control so as to output the output time stamp, and the coded data stored in the temporary storage means, when a value obtained by adding an arbitrary value to the output time stamp is equal to or larger than the time stamp based on the fixed frame rate, and performs a control so as to output the output time stamp, and the coded data which means that its size is 0 and is outputted from the size 0 frame formation means, when the value obtained by adding the arbitrary value to the output time stamp is smaller than the time stamp based on the fixed frame rate.

13. The data recording apparatus of claim 9, wherein said fixed frame rate conversion means further includes a coded data time stamp continuation means for rewriting the input time stamp of the coded data outputted from the temporary storage means, and the input time stamp of the coded data which means non-updation and is outputted from the non-updation frame formation means, so as to make these input time stamps continuous, on the basis of the output time stamp.

14. The data recording apparatus of claim 10, wherein said fixed frame rate conversion means further includes a coded data time stamp continuation means for rewriting the input time stamp of the coded data outputted from the temporary storage means, and the input time stamp of the coded data which means that its size is 0 and is outputted from the size 0 frame formation means, so as to make these input time stamps continuous, on the basis of the output time stamp.

* * * * *